United States Patent [19]
Sugimoto et al.

[11] Patent Number: 5,981,048
[45] Date of Patent: Nov. 9, 1999

[54] COMPLETELY LIGHT-SHIELDING PACKAGING MATERIAL FOR PHOTOSENSITIVE MATERIAL AND PACKAGE USING SAME

[75] Inventors: Hideyuki Sugimoto; Mutsuo Akao; Hiroyuki Osanai, all of Kanagawa-ken, Japan

[73] Assignee: Fuji Photo Film Co., Ltd., Kanagawa-Ken, Japan

[21] Appl. No.: 08/759,719

[22] Filed: Dec. 6, 1996

[30] Foreign Application Priority Data

Dec. 8, 1995 [JP] Japan .................................. 7-345829

[51] Int. Cl.$^6$ .............................. B32B 7/02; B32B 27/08; B32B 27/20; B32B 27/32
[52] U.S. Cl. .................. 428/216; 428/35.2; 428/35.7; 428/213; 428/215; 428/323; 428/515; 428/516; 428/523; 428/910; 206/524.1
[58] Field of Search .................. 428/35.7, 35.2, 428/323, 910, 500, 515, 516, 523, 212, 213, 215, 216; 206/524.1

[56] References Cited

U.S. PATENT DOCUMENTS

| | | | |
|---|---|---|---|
| 4,452,846 | 6/1984 | Akao | 428/220 |
| 4,579,781 | 4/1986 | Akao | 428/461 |
| 4,701,359 | 10/1987 | Akao | 428/35 |
| 4,780,357 | 10/1988 | Akao | 428/216 |
| 5,075,163 | 12/1991 | Akao | 428/323 |
| 5,492,741 | 2/1996 | Akao et al. | 428/35.2 |

FOREIGN PATENT DOCUMENTS

| | | |
|---|---|---|
| 63-26697 | 5/1988 | Japan . |
| 2-2700 | 1/1990 | Japan . |
| 2-2701 | 1/1990 | Japan . |
| 5-40889 | 6/1993 | Japan . |

OTHER PUBLICATIONS

Schut, Jan H., "Enter A New Generation of Polyolefins." Plastics, pp. 15–17, Nov. 1991.

*Primary Examiner*—Vivian Chen
*Attorney, Agent, or Firm*—Sughrue, Mion, Zinn Macpeak & Seas, PLLC

[57] ABSTRACT

A completely light-shielding packaging material for a photosensitive material obtained on laminating two sorts of separately molded light shielding thermoplastic resin films of different properties on the photosensitive material side and on its outer side via an adhesive layer. The outer thermoplastic resin film is a polypropylene-based resin film at least containing a light-shielding material and a homopolypropylene resin or an α-olefin containing polypropylene-based resin and having a Young's modulus in the longitudinal direction of 150 to 600 kg/mm$^2$ and a thickness of 15 to 80 μm. The inner thermoplastic resin film is a polyolefin-based resin film at least containing a light-shielding material, an ethylene copolymer resin and a polyolefin resin, and having a Young's modulus in the longitudinal direction of not higher than 120 kg/mm$^2$ and a thickness of 20 to 150 μm. This material has physical strength, heat-sealing performance, and amenability to bag making. Light-shielding bag for photosensitive material is produced.

21 Claims, 7 Drawing Sheets

COMPLETELY LIGHT-SHIELDING PACKAGING MATERIAL FOR PHOTOSENSITIVE MATERIAL AND PACKAGE USING SAME

TECHNICAL FIELD OF THE INVENTION

This invention relates to a completely light-shielding packaging material for a photosensitive material obtained on laminating two sorts of separately molded light-shielding films by a laminating step employing an adhesive, and to a light-shielding bag for a photosensitive material employing the packaging material. The term "photosensitive" used herein denotes primarily photographic-photosensitive.

BACKGROUND

For packaging photosensitive materials, that is a variety of materials whose commercial value is lost on exposure to light, a packaging material which completely shields the light is used. The properties required of the packaging material include non-impaired photographic properties of the photosensitive materials, light-shielding properties, moisture-proofness, physical strength, such as fracture strength, tearing strength, impact breakage strength or Gerbotester strength, heat-sealing properties, such as heat-sealing strength, chronological heat-sealing strength or hot sealing strength, and anti-static properties. The following publications have been issued in this technical field.

A packaging bag employing a laminated film having a metal layer and having a polyolefin (PO)-based resin layer including a PET layer/adhesive layer/aluminum foil/light-shielding material and a non-ionic anti-static agent, as viewed from the outer side, with an optical density of not less than 7.5 (packaging bag for a photosensitive material disclosed in JP Patent Kokoku JP-B-63-26697).

A packaging film having a light-shielding L-LDPE resin film layer containing not less than 50 wt % of an L-LDPE resin and not less than 1 wt % of a light-shielding material (JP-Patent Kokoku JP-B-2-2700 for a film for packaging a photosensitive material). A laminated film formed by laminating an L-LDPE resin film layer substantially containing no light-shielding material and a completely light-shielding flexible sheet (JP Patent Kokoku JP-B2-2701 for a packaging material for a photosensitive material). A packaging material for a photosensitive material formed by laminating, via an adhesive layer, a polypropylene resin film layer on an innermost L-LDPE film layer containing not less than 40 wt % of L-LDPE resin, carbon black and a fatty acid amide-based lubricant (JP Patent Kokoku JP-B-5-40889 for a packaging material for a photosensitive material).

SUMMARY OF THE DISCLOSURE

In the course of the present invention the following problems have been found.

The packaging bag of JP-B-63-26697, referred to above, includes a laminated aluminum foil for securing light shielding properties and moisture-proofness and hence is low in physical strength and susceptible to breakage. In addition, since the bag has a heat-sealing layer containing a conventional PO resin admixed with a non-ionic anti-static agent and the light-shielding material, the heat-sealing strength becomes inferior after lapse of at least one month of heat sealing, such that it is difficult to maintain complete hermetic sealing and light shielding performance for a prolonged period of time.

The packaging material disclosed in JP-B-2-2700 is superior for packaging photosensitive material in that it is superior in physical strength and heat sealability inclusive of chronological heat sealing strength and film moldability. However, for securing moisture-proofness and Young's modulus, it is necessary to laminate flexible sheets, such as aluminum foils or paper sheets, thus raising problems in connection with amenability to discarding or recycling after use. The laminated film of JP-B-2-2701 is not satisfactory for complete hermetic light-shielding a photosensitive material of large mass and sharp edge. Finally, the packaging material of JP-B-5-40889 has such a defect that, since the polypropylene resin film layer is a sole layer, it is fluctuated significantly in resistance against cold weather, particularly against impacts, while being brittle because of the high Young's modulus value.

It is an object of the present invention to provide a novel improved completely light-shielding packaging material for a photosensitive material and a light-shielding bag (generally package) for a photosensitive material prepared using this packaging material.

It is a more specific object of the present invention to overcome the problem inherent in the above-enumerated conventional packaging materials and to provide a completely light-shielding packaging material for a photosensitive material and a light-shielding bag which is less costly, high in physical strength and bag forming capability and able to maintain complete light shielding properties for prolonged time and which exhibits improved adaptability to recycling and discarding.

Further objects will become apparent in the entire disclosure.

According to a primary aspect, the present invention provides a completely light-shielding packaging material for a photosensitive material comprised of two types of light-shielding thermoplastic resin films of different properties molded separately from each other. One of the resin films is layered towards the photosensitive material and the other resin film is layered outwardly of the photosensitive material via an adhesive layer. The outward thermoplastic resin film is a polyolefin-based resin film having a Young's modulus in the longitudinal direction according to JIS K7127 of 150 to 600 kg/mm² and a thickness of 15 to 80 μm, and containing at least 0.1 to 20 wt % of a light-shielding material, not less than 70 wt % of a polypropylene-based resin and 0.001 to 5 wt % of a lubricant and/or an anti-static agent. The polypropylene-based resin consists essentially of at least one of a homopolypropylene resin and/or a propylene-α-olefin copolymer resin containing 0.001 to 3 wt % of α olefin with 2 or 4 to 10 carbon atoms (hereinafter referred to as "$C_n$" for containing "n"-carbon atoms). The inward thermoplastic resin film is a polyolefin-based resin film having a Young's modulus in the longitudinal direction according to JIS K7127 of not higher than 120 kg/mm² and a thickness of 20 to 150 μm. The inward polyolefin-based resin film contains at least 0.1 to 30 wt % of a light-shielding material, not less than 3 wt % of an ethylene copolymer resin, 0.001 to 5 wt % of a lubricant and/or an anti-static agent, and not less than 62 wt % of a polyolefin resin. This constitution is referred to herein as "the basic constitution".

With the above constitution, a completely light-shielding packaging material for a photosensitive material can be produced which exhibits a combination of various properties hitherto thought to be difficult to realize, namely light-shielding properties, moisture-proofness, physical strength (such as fracture strength, impact breakage strength or Gerbotester strength) heat-sealing properties, anti-static properties, film moldability, Young's modulus, amenability to discarding or recycling, wear resistance and surface strength, and which is less costly, easy to be formed into bags and free from adverse effects on photographing performance.

The outer polypropylene-based resin film is superior in light-shielding performance, moisture-proofness, physical strength and Young's modulus etc., while the inner polyolefin-based film is superior in light-shielding performance, moisture-proofness, physical strength, amenability to heat-sealing and film moldability etc. By laminating the two films together, a completely light-shielding packaging material for photosensitive material can be produced which has all of the above-enumerated properties, and which is inexpensive, easy to be formed into bags and superior in amenability to discarding and recycling as compared to a composite packaging material produced by laminating paper, aluminum foils or polyester resin films via adhesive layers.

According to further aspects 2 to 9, there are provided preferred embodiments based on Aspect 1. That is, Aspect 2 is directed to a completely light-shielding packaging material for a photosensitive material wherein the polypropylene-based resin is composed of at least one of a homopolypropylene resin and/or a propylene-α-olefin copolymer resin containing 0.001 to 3 wt % of a propylene-α olefin with 2 or 4 to 10 carbon atoms, making up the outward polypropylene-based resin film, the polypropylene-based resin comprising not less than 70 wt % of a homopolypropylene resin having a melt flow rate (referred to as "MFR") according to JIS K6758 of 0.5 to 10 g/10 min, an aisotactic index of 93 to 99.5 and a Vicat softening point according to JIS K6758 of 135 to 160° C. By this constitution, a light-shielding bag for a photosensitive material can be produced which is superior in moisture-proofness, bag-breakage strength, wear resistance, surface strength, physical strength and amenability to heat sealing.

Aspect 3 is directed to a completely light-shielding packaging material for a photosensitive material wherein the thermal contraction rate at 150° C. in the longitudinal direction of the outward polypropylene-based resin film is 5±3%. If the thermal contraction rate is 5±3%, there can be provided a light-shielding bag for a photosensitive material which is free from poor heat sealing performance or occurrence of poor outward appearance such as wrinkles or streaks due to thermal contraction of the polypropylene-based resin film during heat sealing.

Aspect 4 is directed to a completely light-shielding packaging material for a photosensitive material, wherein the outward polypropylene-based resin film has a melting point according to the DSC method of not less than 150° C. If the melting point is not less than 150° C., only the inner polyolefin-based resin film can be melted during heat sealing, thus preventing pinholes from being produced during heat sealing.

Aspect 5 is directed to a completely light-shielding packaging material for a photosensitive material, wherein the outward thermoplastic resin film is an outward multi-layer co-extruded film, and one or more of at least intermediate layer(s) of the outward co-extruded film contains 0.1 to 10 wt % of a light-shielding material. The intermediate layer(s) herein mean layer(s) interposed between the layers making up the multi-layered co-extruded film. If the multi-layered co-extruded film is made up of two layers, there is no intermediate film. In such case, one of the two layers contains 0.1 to 10 wt % of the light-shielding material. By such constitution, light-shielding properties can be secured without deteriorating film moldability.

Aspect 6 is directed to a completely light-shielding packaging material for a photosensitive material, wherein the outward polypropylene-based resin film or the outward multi-layer co-extruded film is stretched by a (magnitude) factor of 3 to 12 fold in the longitudinal direction and by a factor of 4 to 12 fold in the transverse direction. By this stretching, there can be obtained a film superior in physical strength, Young's modulus and moisture-proofness.

Aspect 7 is directed to a completely light-shielding packaging material for a photosensitive material, wherein the inward polyolefin-based resin film contains not less than 3 wt % of an ethylene-α olefin copolymer resin having a melt flow rate (condition E of ASTM D-1238) of 0.1 to 10 g/10 min and a density (ASDM D-1505) of 0.86 to 0.95 g/cm. With such characteristic value, there can be produced a film superior in physical strength, amenability to heat sealing and film moldability.

Aspect 8 is directed to a completely light-shielding packaging material for a photosensitive material, wherein the inward thermoplastic resin film is an inward multi-layer co-extruded film whose innermost layer contains not less than 50 wt % of a heat-sealable resin having a Vicat softening point according to JIS K6760 of not higher than 125° C., said heat-sealable resin being homopolyethylene resin and/or ethylene copolymer resin. By using this constitution, low-temperature heat sealing becomes possible, such that heat sealing becomes possible at a temperature for which the outward polypropylene based resin film or the outward multi-layer co-extruded film is not melted.

Aspect 9 is directed to a completely light-shielding packaging material for a photosensitive material, wherein the inward polyolefin-based resin film or the inward multi-layer co-extruded film has a melting point according to the DSC method of not higher than 140° C. By using this melting point, low-temperature heat sealing is enabled, such that heat sealing becomes possible at a temperature for which the outward polypropylene based resin film or the outward multi-layer co-extruded film is not melted.

According to a further aspect, the light-shielding bag for a photosensitive material is produced by a heat-sealing method using a packaging material produced on laminating the outer polypropylene-based resin film or the outer multi-layer co-extruded film and the inner polyolefin-based resin film or the inner multi-layer c o-extruded film. The outer polypropylene-based resin film or an outermost layer of the outer multi-layer co-extruded film remote from the photosensitive material has a softening point, a melting point by the DSC method and the Young' modulus higher, by not less than 15° C., not less than 10° C. and not less than 30 kg/mm$^2$, respectively, than those of the inner polyolefin-based resin film or an innermost layer of the inner multi-layer co-extruded film closest to the photosensitive material. By the above constitution, a completely light-shielding packaging material for a photosensitive material can be produced which exhibits various properties hitherto thought to be difficult to realize, namely light-shielding properties, moisture-proofness, physical strength (such as fracture strength, impact breakage strength or Gerbotester strength), heat-sealing properties, anti-static properties, film moldability, Young's modulus, amenability to discarding or recycling, wear resistance and surface strength etc., and which is less costly, easy to be formed into bags and free from adverse effects on photographing performance.

Figure 1:
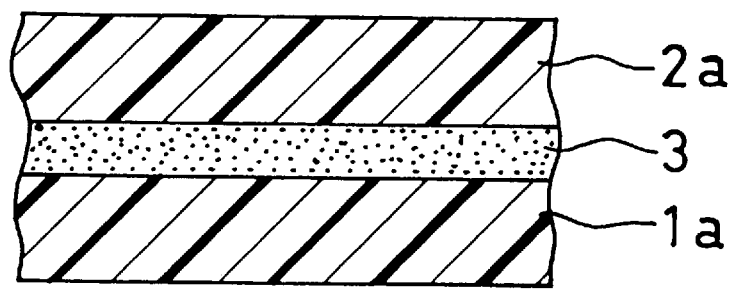
FIG. 1 is a schematic cross-sectional view of a packaging material according to embodiment 1 of the present invention.

EXPLANATION OF REFERENCE NUMERALS a, . . . specifying the content of the light-shielding material;

1a, . . . inner polyolefin resin film;

2a, . . . outer polyolefin resin film;

3, . . . adhesive layer;

4a, . . . a light-shielding thermoplastic resin film layer simultaneously co-extruded with the inner polyolefin resin film 1a;

5, 5a, . . . light-shielding thermoplastic resin film layers simultaneously co-extruded with the outer polyolefin resin film 2a;

6, . . . heat-resistant flexible sheet layer;

Ia, . . . multi-layer co-extruded film;

IB, . . . inner blocking bonding light-shielding laminated film;

B, . . . blocking bonding;

IIa, . . . outer multi-layer co-extruded film;

7, . . . light-shielding bag

8, . . . fused (multi-point sealed) side of the light-shielding bag;

9, . . . heated and pressed bottom of the light-shielding bag;

10, . . . multi-point hot plate;

11, . . . steel belt;

12, . . . film;

13, . . . heating section;

14, . . . cooling section;

15, . . . opening in the light-shielding bag via which to introduce or take out the photosensitive material.

PREFERRED EMBODIMENTS OF THE INVENTION

The present invention will now be explained with reference to preferred embodiments thereof. It should however be noted that these are merely illustrative and are not intended for limiting the invention.

Embodiment 1

FIG. 1 schematically shows the cross-section of a packaging material according to a first embodiment of the invention. Of two sorts of separately molded light-shielding thermoplastic resin films, an outer polypropylene-based resin film 2a is a biaxially stretched polypropylene-based resin film having a Young's modulus in the longitudinal direction according to JIS K7127 of 300 kg/mm$^2$, a Young's modulus in the transverse direction of 400 kg/mm$^2$, permeability to moisture of 3.5 g/m$^2$·24 hrs and a thickness of 50 µm. The outer resin film 2a contains 95.6 wt % of a homopolypropylene resin with MFR of 4 g/10 minutes, a softening point of 150° C., a melting point according to the DSC method of 169° C. and an isostatic index of 97; 3 wt % of furnace carbon black having a mean particle size of 21 µm, pH of 7.0, DBP oil absorption quantity of 85 ml/100 g, a refractive index as measured by Larsen oil immersion method of 1.56, a specific gravity of 1.9 and sulfur content as measured by ASTM D1619 of 0.4%; 0.3 wt % of calcium stearate as lubricant, 1 wt % of "Electro-Stripper TS-5" manufactured by KAO KK, as anti-static agent; 0.05 wt % of tetrakis [methylene-3-(3',5'-di-t-butyl-4-hydroxyphenyl) propionate]methane, as anti-oxidant; and 0.05 wt % of tris-(2, 4-di-t-butylphenyl)phosphite. This resin film 2a has been stretched by 5 fold and 7 fold in the longitudinal and transverse directions, respectively.

The inner polyolefin-based resin film 1a is a polyolefin-based resin film having a Young's modulus in the longitudinal direction according to JIS K7127 of 38 kg/mm$^2$, a Young's modulus in the transverse direction of 42 kg/mm$^2$, permeability to moisture of 3 g/m$^2$·24 hrs and a thickness of 60 µm. The inner resin film 1a contains 5 wt % of furnace carbon black with a mean particle size of 25 µm, pH of 7.7, a DBP oil absorption amount of 110 ml/100 g, a refractive index as measured with the Larsen oil immersion method of 1.58, a specific gravity of 1.8, a sulfur content as measured by the method of ASTM D1619 of 0.25%; 88.25 wt % of an ethylene-octene-1 copolymer resin with MFR of 2 g/10 minutes, a density of 0.920 g/cm$^3$, a Vicat softening point of 93° C., and a melting point as measured by the DSC method of 109° C.; 5 wt % of a homopolyethylene resin having MFR of 2.4 g/10 min, a density of 0.920 g/cm$^3$, a Vicat softening point of 93° C. and a melting point of 109° C. ; 0.2 wt % of calcium stearate, 0.2 wt % of zinc stearate and 0.05 wt % of erucic amide as lubricant; 1 wt % of monoglyceride stearate as anti-static agent; 0.05 wt % of tetrakis [methylene-3-(3', 5'-di-t-butyl-4-hydroxyphenyl)propionate]methane and 0.05 wt % of 2,6-di-t-butyl-p-cresol, as anti-oxidant; and 0.2 wt % of synthetic silica.

These two sorts of the light-shielding thermoplastic resin films are laminated together via an extrusion-laminated adhesive layer 3 of a homopolyethylene resin with a thickness of 15 μm, MFR of 7.0 g/10 minutes and a density of 0.918 g/cm$^3$ to form a completely light-shielding packaging material for a photosensitive material having a total thickness of 125 μm. In the description of the Young's modulus, the longitudinal and transverse directions denote the direction along the length and width of the film, respectively.

Embodiment 2

Figure 2:
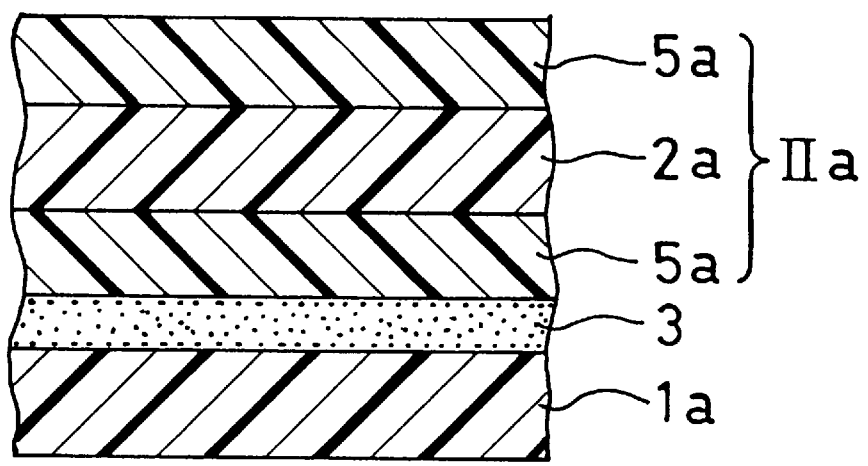
FIG. 2 is a schematic cross-sectional view of a packaging material according to embodiment 2 of the present invention.

FIG. 2 schematically shows the cross-section of a packaging material according to a second embodiment. Of two sorts of separately molded light-shielding thermoplastic resin films, an outer multi-layer co-extruded film IIa is a three-layer co-extruded film, with a thickness of 50 μm, made up of an outer polypropylene-based resin film 2a and thermoplastic resin film layers 5a, 5a co-extruded simultaneously on both sides of the outer polypropylene-based resin film 2a. The outer polypropylene-based resin film 2a has a thickness of 40 μm with the same resin composition as that of the outer polypropylene-based resin film 2a of the embodiment 1. The semi-transparent thermoplastic resin film layers 5a, 5a with a thickness of 5 μm, containing a light-shielding material (calcium carbonate), on both sides of the outer polypropylene-based resin film 2a, have resin compositions which are the same as each other. Specifically, this resin composition comprises 30 wt % of homopolypropylene resin having MFR of 5 g/10 minutes, a Vicat softening point of 151° C., a melting point as measured by the DSC method of 170° C. and an aisostatic index of 98; 66.18 wt % of homopolypropylene resin having MFR of 4 g/10 min, a Vicat softening point of 150° C., a DSC melting point of 169° C. and an isostatic index of 97; 0.3 wt % of calcium stearate and 0.2 wt % of zinc stearate as metal salts of fatty acid; 1 wt % of "Electro-Stripper TS-5" manufactured by KAO KK as anti-static agent; 0.07 wt % of tetrakis [methylene-3-(3',5'-di-t-butyl-4-hydroxyphenyl)phosphite as anti-oxidant; 0.2 wt % of Gel-ol MD, which is a dibenzylidene sorbitol-based compound as an organic nucleating agent; and 2 wt % of calcium carbonate as a light-shielding material. This multi-layer co-extruded film IIa was bi-axially stretched five-fold in the longitudinal direction and seven-fold in the transverse direction and heat-set, after which both sides of the co-extruded film (an outer surface and an inner surface of the multi-layer co-extruded film IIa) were processed with corona discharge. The multi-layer co-extruded film IIa has a Young's modulus in the longitudinal direction and a Young's modulus in the transverse direction according to JIS K7127 of 327 kg/mm$^2$ and 443 kg/mm$^2$, respectively, and a moisture permeation rate of 3.1 g/m$^2$·24 hrs. The adhesive layer 3 and the inner polyolefin resin film 1a, which are the same as those of the embodiment 1, were laminated as shown in FIG. 2 to form a completely light-shielding packaging material for a photographic material.

Figure 3:
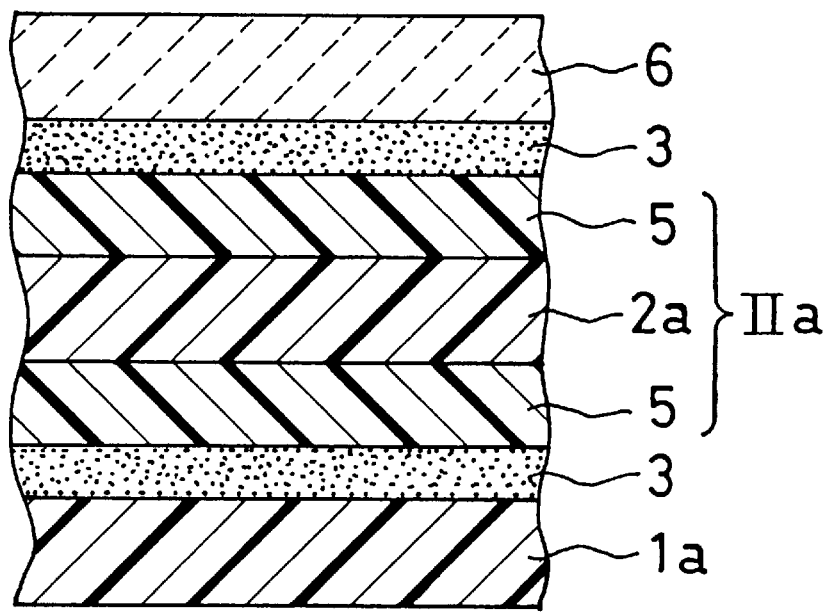
FIG. 3 is a schematic cross-sectional view of a packaging material according to embodiment 3 of the present invention.

FIG. 3 schematically shows the cross-section of a packaging material according to a third embodiment. An outer multi-layer co-extruded film IIa is a three-layered light-shielding multi-layer co-extruded film molded by T-die, employing a thermoplastic resin film layer 5 corresponding to the thermoplastic resin film layer 5a of the embodiment 2 from which calcium carbonate as a light-shielding material has been removed. On the outer multi-layer co-extruded film IIa is laminated an inner polyolefin resin film 1a, which is the same as the film used in the embodiment 1, via an adhesive layer 3 which is the same as that used in the embodiment 2. On the outermost thermoplastic resin film layer 5 of the laminated film, with a total thickness of 125 μm, non-bleached Kraft paper 6 with a basis weight of 50 g/m$^2$ and a thickness of 55 μm, not affecting photographic performance, was laminated to form a completely light-shielding packaging material for a photosensitive material having a total thickness of 195 μm.

Embodiment 4

Figure 4:
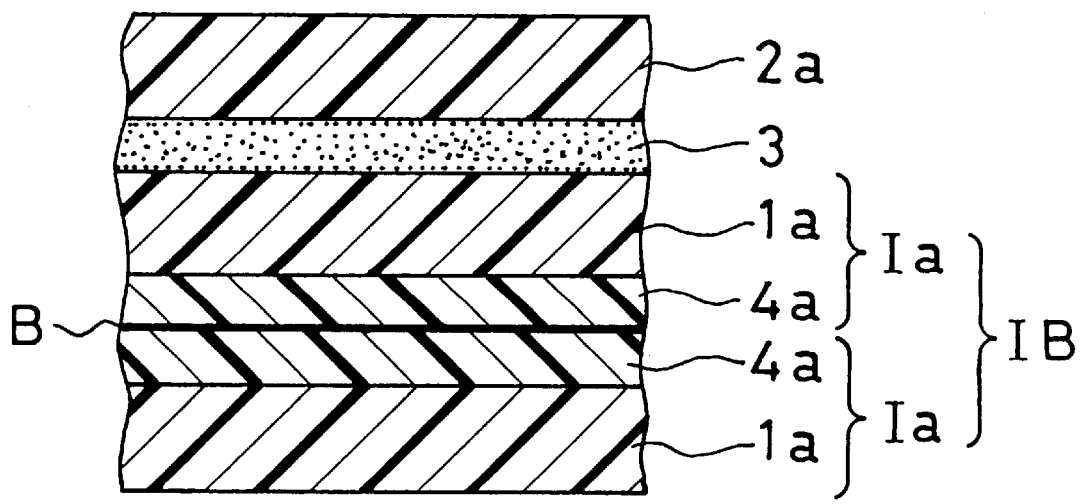
FIG. 4 is a schematic cross-sectional view of a packaging material according to embodiment 4 of the present invention.

FIG. 4 schematically shows the cross-section of a packaging material according to a fourth embodiment. Of two sorts of separately molded light-shielding thermoplastic resin films, an outer multi-layer co-extruded film 2a is a light-shielding polypropylene-based resin film, with a thickness of 50 μm, which is the same as that of the embodiment 1. An adhesive layer 3 is also the same as that in the embodiment 1. A multi-layer co-extruded film Ia, constituting a blocking-bonded light-shielding laminated film IB, is a light-shielding dual-layer co-extruded inflation-molded film, with a thickness of 30 μm. This film Ia is obtained on double-layer co-extrusion inflation film molding, and is made up of an inner light-shielding polyolefin resin film 1a, with a thickness of 15 μm, which is of the same resin composition as that of the embodiment 1, and a light-shielding polyolefin resin film 4a, with a film thickness of 15 μm. The resin film 4a is made up of 91.5 wt % of an ethylene-butene-1 copolymer resin with MFR of 2.0 g/10 minutes, a density of 0.90 g/cm$^2$, a Vicat softening point of 94° C. and a DSC melting point of 110° C.; 5 wt % of a homopolyethylene resin, with MFR of 5 g/10 minutes, a density of 0.918 g/cm$^2$, a vicat softening point of 94° C., a DSC melting point of 110° C. and a molecular weight distribution of 4.7, produced on polymerization using a metal methallocene polymerization catalyst; 3 wt % of furnace carbon black with a mean particle size of 24 μm, a pH value of 8.0, a DBP oil absorption amount of 60 ml/100 g, a refractive index value as measured by a oil immersion method by Larsen of 1.57, a specific gravity of 1.9 and a sulphur content as measured by a method according to ASTM D 1619 of 0.52%; 0.2 wt % of calcium stearate and 0.2 wt % of zinc stearate as lubricant; and 0.05 wt % of tetrakis [methylene-3-(3',5'-di-t-butyl-4-hydroxyphenyl) propionate]methane and 0.05 wt % of stearyl-β-(3,5-di-t-butyl-4-hydroxyphenyl)propionate as an anti-oxidizing agent. The blocking-bonded light-shielding laminated film IB on the photosensitive material is obtained by bonding polyolefin resin films 4a of the multi-layer co-extruded film Ia to each other by a blocking B, without interposition of an adhesive layer, under a nip pressure of a squeeze roll (also termed as "nip roll") used for taking up in the inflation film molding process. The blocking-bonded light-shielding laminated film 1B has a Young's modulus in the longitudinal direction according to JIS K 7127 of 31 kg/mm$^2$ and a moisture permeation rate of 3.4 g/m$^2$·24 hrs, and a thickness of 60 μm. The outer light-shielding polypropylene-based resin film 2a with a thickness of 50 μm and a blocking-bonded light-shielding laminated film IB with a thickness of 60 μm are laminated together via an adhesive layer 3 with a thickness of 15 μm to form a completely light-shielding packaging material for a photosensitive material with a total thickness of 125 μm.

Embodiment 5

Figure 5:
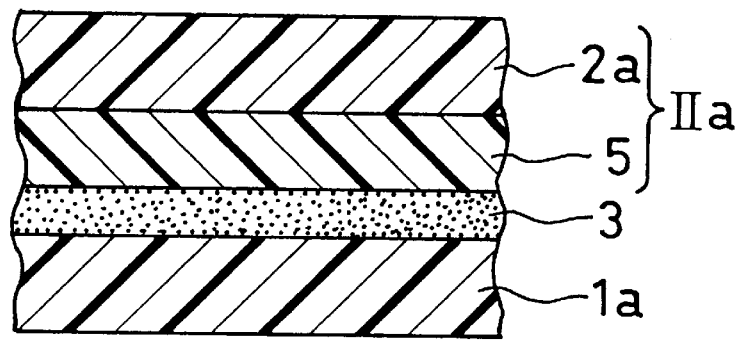
FIG. 5 is a schematic cross-sectional view of a packaging material according to embodiment 5 of the present invention.

FIG. 5 schematically shows the cross-section of a packaging material according to a fifth embodiment. Of two sorts of separately molded light-shielding thermoplastic resin films, an outer multi-layer co-extruded film IIa is a double-layer co-extruded T-die molded film product corresponding to the outer multi-layer co-extruded film IIa of the embodiment 3 from which the thermoplastic resin film layer 5 has been removed. It has Young's moduli in the longitudinal and transverse directions according to JIS K7127 of 285 kg/mm$^2$ and 376 kg/mm$^2$, respectively, moisture permeation rate of 3.2 g/m$^2$·24 hrs and a thickness of 50 μm. On this outer multi-layer co-extruded film IIa is laminated an inner polyolefin resin film 1a with a thickness of 60 μm which is the same as that of the embodiment 3, with interposition of an adhesive layer 3 with a thickness of 15 μm to form a completely light-shielding packaging material for a photosensitive material with a to a thickness of 125 μm.

Embodiment 6

Figure 6:
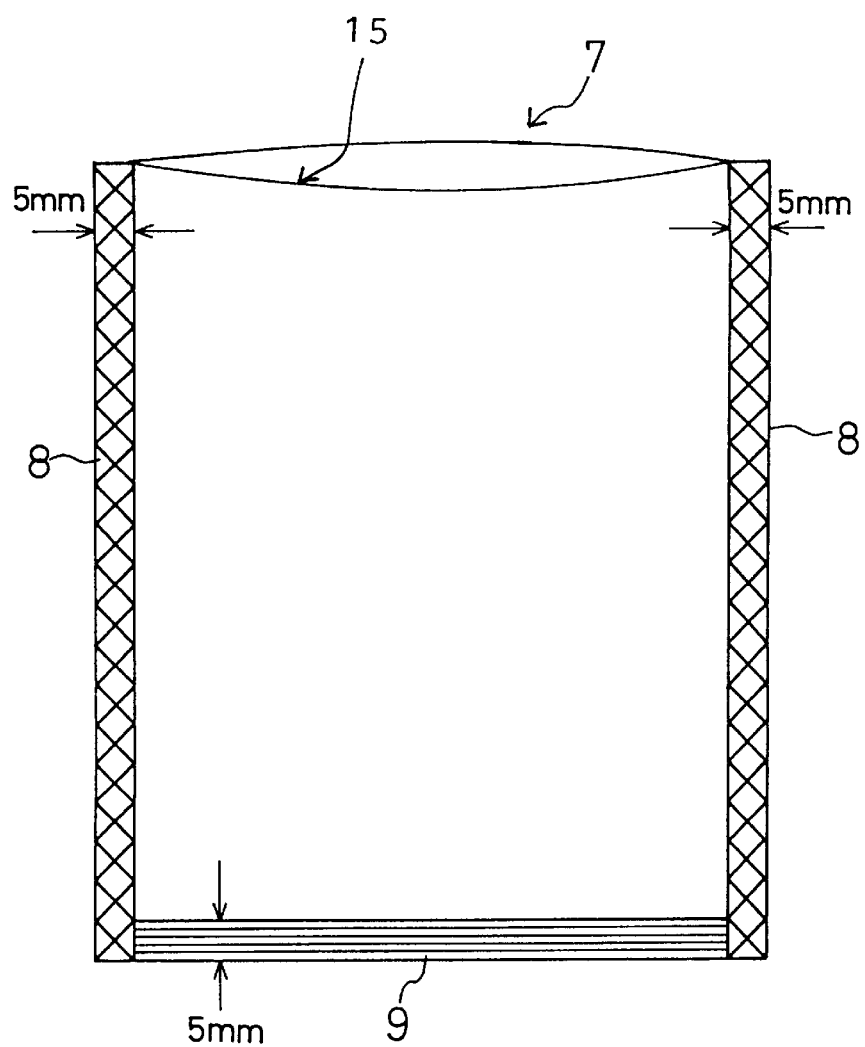
FIG. 6 is a schematic view, as viewed from above, and showing a light-shielding bag sealed on three sides according to embodiment 6 of the present invention.
Figure 7:
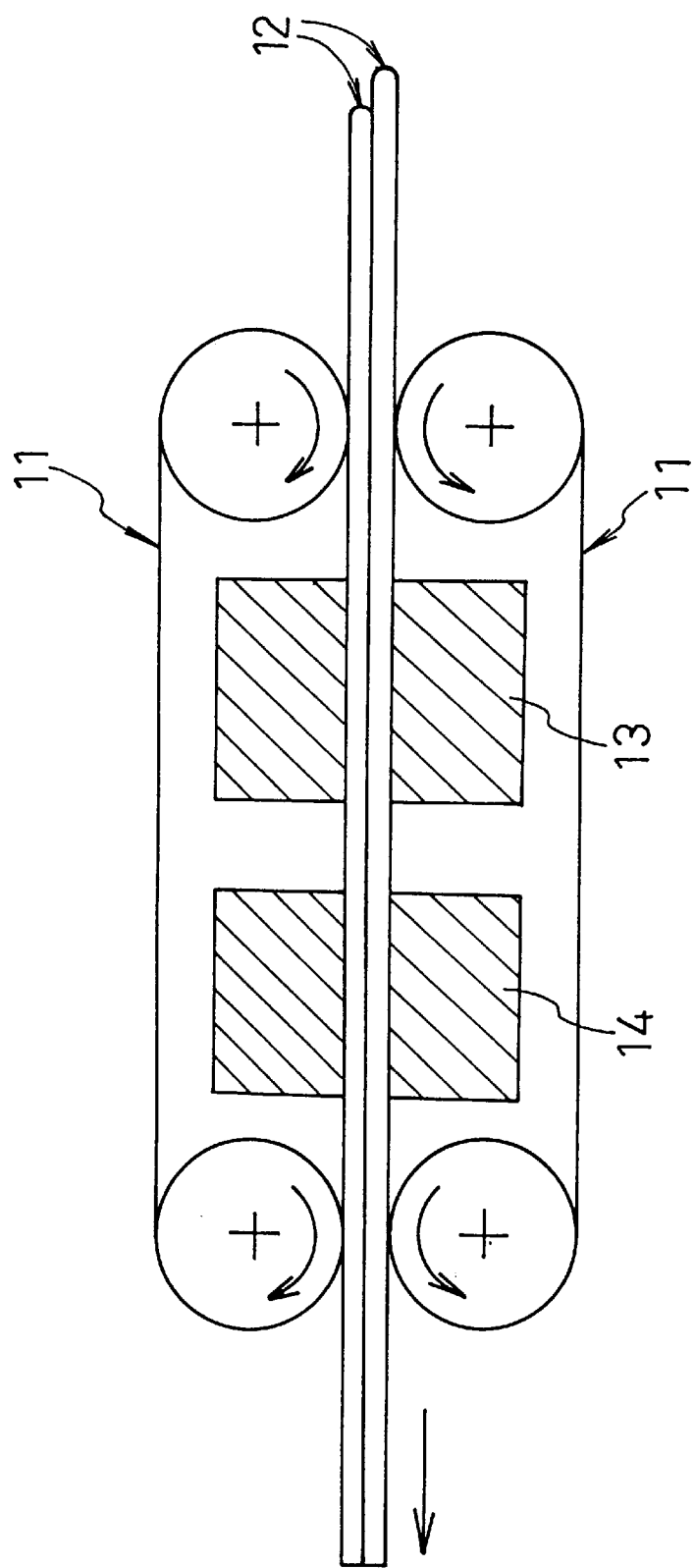
FIG. 7 is a schematic view showing a process of automatic bag making of the light-shielding bag of embodiment 6 of the present invention.
Figure 8A:
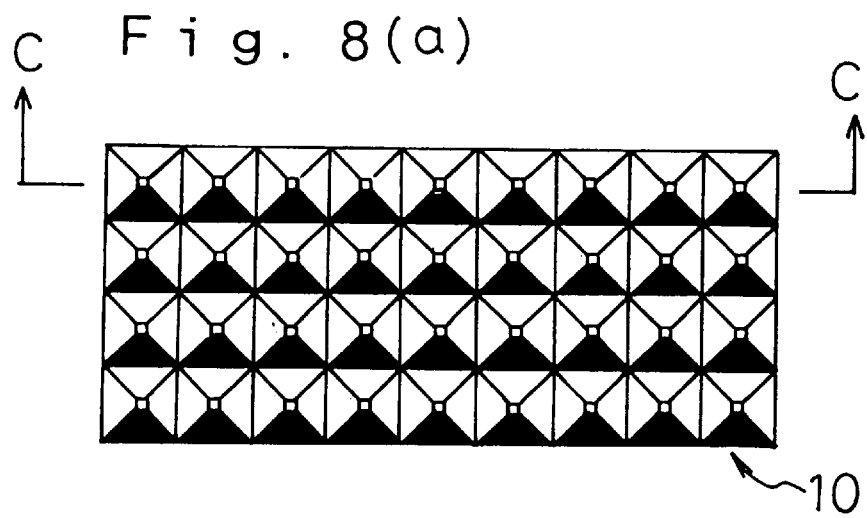
FIGS. 8a is a schematic view, as viewed from above, and showing a multi-point hot plate according to embodiment 6 of the present invention.
Figure 8B:
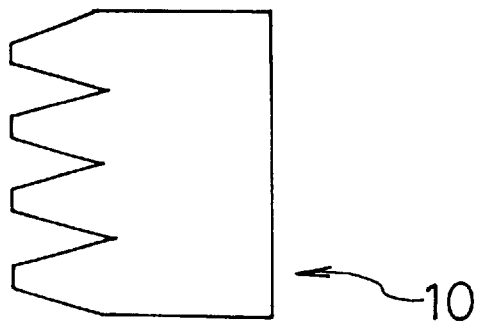
FIG. 8b is a schematic side view of a multi-point hot plate according to embodiment 6 of the present invention.
Figure 8C:
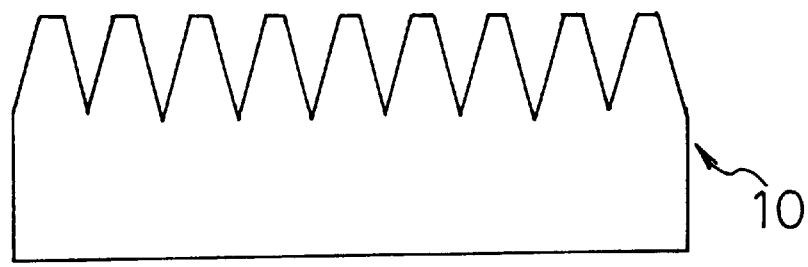
FIG. 8c is a schematic view showing a cross-section taken along line C—C of FIG. 8a and showing the multi-point hot plate according to embodiment 6 of the present invention.
Figure 9:
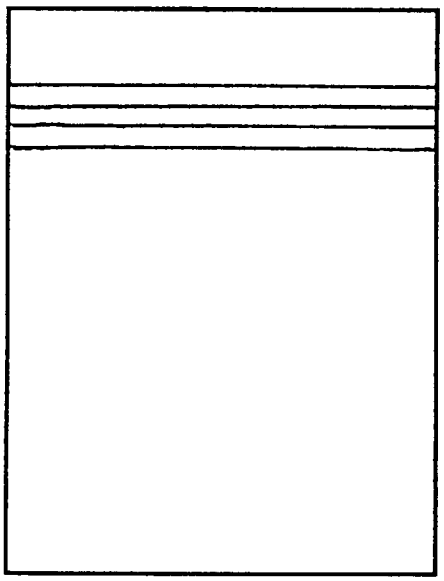
FIG. 9 is a schematic view showing the shape of recessed streaks (transverse seals) of a heat-sealing section of a light shielding bag for the photosensitive material embodying the present invention.
Figure 10:
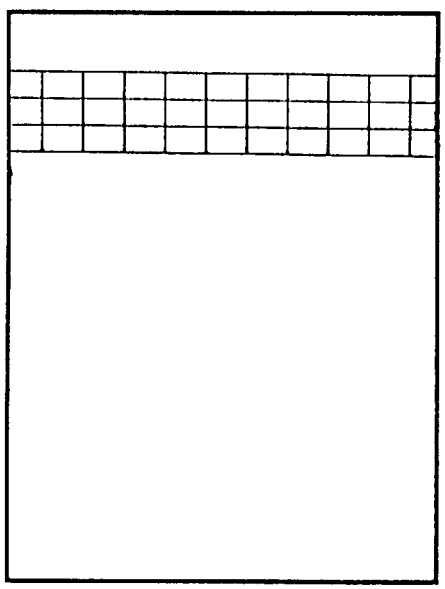
FIG. 10 is a schematic view showing the shape of recessed streaks (checkerboard pattern seals) of a heat-sealing section of a light shielding bag for the photosensitive material embodying the present invention.
Figure 11:
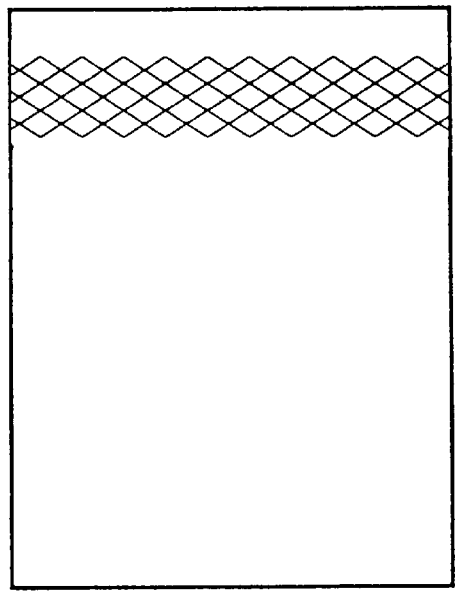
FIG. 11 is a schematic view showing the shape of recessed streaks (meshed pattern seals) of a heat-sealing section of a light shielding bag for the photosensitive material embodying the present invention.
Figure 12:
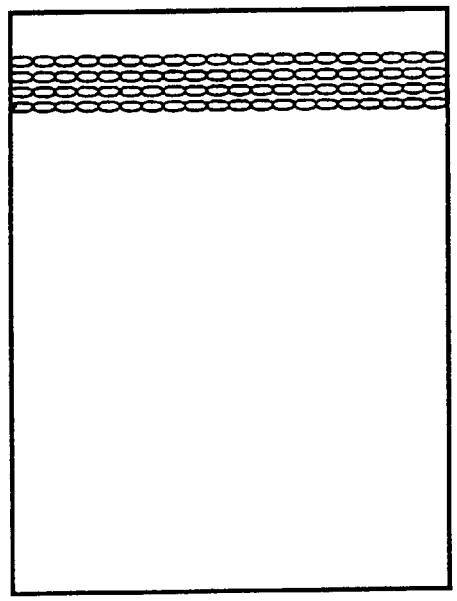
FIG. 12 is a schematic view showing the shape of recessed streaks (silk pattern seals) of a heat-sealing section of a light shielding bag for the photosensitive material embodying the present invention.

Using a completely light-shielding packaging material for a photosensitive material according to the embodiments 1 to 5, a light-shielding bag heat-sealed on three sides was produced automatically. FIG. 6 shows schematically, viewed from above, a light-shielding bag 7 heat-sealed on three sides. For heat-sealing, the innermost sides of the packaging material are overlapped and passed through an endless steel belt presenting plural indented shapes termed "multi-points" (see FIG. 8) so as to be heat-fused to a width of 5 mm and cooled immediately. This process is repeated continuously (see FIG. 7) for heat-sealing both sides 8 of the light-shielding bag 7, as shown in FIG. 6. FIG. 7 schematically shows the process of automatically forming the light-shielding bag 7. FIG. 8 shows a multi-point hot plate 10. FIGS. 8-a, 8-b and 8-c are schematic top plan view of the hot plate 10, a schematic side view of the hot plate and a cross-sectional view taken along line c—c of FIG. 8-a, respectively. The light-shielding bag 7 has its bottom 9 heat-sealed to a width of 5 mm with five linear seals by overlapping the innermost layers of the packaging material for clamping the bottom with a hot plate and a silicon rubber with heating and pressing.

This light-shielding bag 7 for the photosensitive material provides not only completely hermetical sealing and light-shielding but also is superior in moisture-proofness, bag-breaking strength, wear resistance, surface strength, bag-forming properties, amenability to recycling and discarding, physical strength (tearing strength, impact breakage strength or Gelbotester strength), anti-static performance, amenability to heat-sealing and outer appearance. In particular, the melting point of the inner polypropylene based resin film 2a or the outer multi-layer c-extruded film IIa as measured by the DSC method is 160° to 175° C., whereas the melting point of the inner polyolefin resin film 1a or the blocking-bonded light shielding laminated film IB towards the photosensitive material, as measured by the DSC method, is 120° to 135° C., thus presenting a temperature difference of 25 to 55° C. Thus, if the bag is produced at higher temperatures at a high speed, there is no risk of generation of streaks, wrinkles, pinholes or melt holes, thus assuring superior amenability to bag-forming and high productivity. In addition, since the packaging material used for the light-shielding bag 7 is inexpensive, cost reduction of at least 30% becomes possible in providing the light shielding bag for the photosensitive material having the same physical strength.

Further preferred embodying modes will be hereinafter explained.

The outer polypropylene-based resin film or the outer multi-layer co-extruded film of the completely light-shielding photosensitive material preferably has at least its one side (inner or outer side of the outer polypropylene-based resin film or the outer multi-layer co-extruded film) processed by corona discharging. This processing with corona discharging prohibits the lubricant and/or the anti-static agent from being bled out to the film surface to produce static marks on the photosensitive material.

The inner polyolefin-based resin film of the completely light-shielding packaging material for the photosensitive material at least preferably contains an arbitrary amount of not less than 10 wt % of ethylene-α-olefin copolymer resin obtained by copolymerizing α-olefin of an optional number of 4 to 10 carbon atoms with an arbitrary amount of 0.1 to 15 wt % of ethylene, an arbitrary amount of 0.1 to 30 wt % of carbon black and an arbitrary amount of from 0.001 to 5 wt % of the lubricant and/or anti-static agent, and an arbitrary amount of from 0.0001 to 1 wt % of an anti-oxidation agent. Such composition gives a film superior in film moldability, physical strength, moisture-proofness, light-shielding properties, antistatic properties, amenability to heat sealing and to bag forming.

The dynamic frictional coefficient (ASTM D1894) of the outermost layer of the outer polypropylene-based resin film or the outer multi-layer co-extruded film of the light-shielding bag for the photosensitive material is preferably an arbitrary value of not less than 0.20. By using such coefficient, it becomes possible to improve anti-collapsing properties of the bag stack, loading efficiency and handling performance of the packaging bag.

The moisture permeation rate (JIS Z0208) and oxygen permeation rate, as measured by the MOCON method at a temperature of 20° C. and RH of 80%, of the light-shielding bag for the photosensitive material, have preferably an arbitrary value of not higher than 5 g/m$^2$·24 hrs and an arbitrary value of not higher than 1000 cc/m$^2$·24hrs·atm, respectively. By using these values, it becomes possible to maintain good photographic performance of the photosensitive material for a prolonged time.

The surface specific resistance (JIS K-6911) of the outermost layer of the outer polypropylene based resin film or the outer multi-layer co-extruded film of the light shielding bag for the photosensitive material is preferably an arbitrary value not higher than $2 \times 10^{13}$ ohm. With this resistance value, it becomes possible to prevent generation of static marks and deposition of dust and dirt on the photosensitive material.

The lubricants, light-shielding materials, anti-oxidants, photosensitive materials, polyethylene-based resins, L-LDPE resins, ethylene copolymer resins, polyorefin resins, heat-sealing methods and other ingredients, will be hereinafter explained.

Commercially available typical lubricants and manufacturers will be enumerated below. The lubricants may be used solely or as a mixture of two or more, and are not limited to those listed below.

Silicone-based lubricants: dimethyl polysiloxanes of various grades and modified products thereof etc. (SHIN-ETSU SILICONE, TORAY SILICONE). Oleic acid amide lubricants: Armoslip CP (Lion-Akzo), NEWTRON (NIPPON SEIKA), NEWTRON E-18 (NIPPON SEIKA), Amide O (NITTOH KAGAKU), ARFLOW E-10 (NIPPON YUSHI), DIAMID O-200, G-200 (NIPPON KASEI). Erucic acid amide-based lubricants; ARFLOW-P-10(NIPPON YUSHI). Stearic acid amide-based lubricants: ARFLOW-S-10 (NIPPON YUSHI), NEWTRON 2(NIPPON SEIKA), DIAMID 200 (NIPPON KASEI). Bis fatty acid amide based lubricants: Bisamide (NIPPON KASEI), DIAMID 200 bis (NIPPON KASEI), ARMOWAX EBS (Lion-Akzo) etc. Non-ionic surfactant-based lubricants: Electro-Stripper TS-2, Electro-Stripper TS-3 (KAO KK). Hydrocarbon-based lubricants: Liquid paraffin, natural paraffin, microwax, synthetic paraffin, polyethylene wax, polypropylene wax, chlorinated hydrocarbons and fluorocarbons. Fatty acid-based lubricants: higher fatty acids (preferably with an arbitrary number of carbon atoms of not less than $C_{12}$), and oxyfatty acids. Ester-based lubricants: lower alcohol esters, polyhydric alcohol esters, polyglycol esters and fatty alcohol esters, of fatty acids, respectively. Alcohol-based lubricants: polyhydric alcohols, polyglycol polyglycerols. Metal soaps (fatty acid metal salts): compounds of higher fatty acids, such as lauric acid, stearic acid, ricinoleic acid, naphthenic acid or oleic acid with metals, such as Li, Mg, Ca, Sr, Ba, Zn, Cd, Al, Sn or Pb.

For securing light-shielding properties, the light shielding material is added. The following are typical examples of the light-shielding material. Although one or more of the following light-shielding materials can be used, the light-shielding materials are not limited thereto. Inorganic compounds: oxides . . . silica, diatomaceous earth, alumina, titanium oxide, iron oxide, zinc oxides, magnesium oxide, antimony oxide, barium ferrite, strontium ferrite, beryllium oxide, pumice, pumice balloon or alumina fibers. Hydroxides . . . calcium hydroxides, magnesium hydroxide or basic magnesium carbonate. Carbonates . . . calcium carbonate, magnesium carbonate, dolomite or dorsonite. Sulfates (or sulfites) . . . calcium sulfate, barium sulfate, ammonium sulfate, or calcium sulfite. Silicates . . . talc, clay, mica, asbestos, glass fibers, glass balloons, glass beads, calcium silicate, montmorillonite or bentonite. Carbon . . . carbon black, graphite, carbon fibers and hollow carbon balloons. Others . . . iron powders, copper powders, lead powders, tin powders, stainless steel powders, pearl pigments, aluminum powders, molybdenum sulfide, boron fibers, silicon carbide fibers, brass fibers, potassium titanate, lead zirconate titanate, zinc borate, barium metaborate, calcium borate, sodium borate and aluminum paste. Organic compounds . . . wood powders, (pine, oak or sawdust), husk fibers (almond, peanuts or chaffs), various colored fibers, such as cotton, jute, paper strips, cellophane tips, nylon fibers, polypropylene fibers, starch and aromatic polyamide fibers.

Of these light-shielding materials, carbon black is preferred because it reduces the bled-out amount of the lubricant or the anti-oxidant. Most preferred species of carbon black according to classification of the starting materials are gas black, furnace black, channel black, anthracene black, acetylene black, ketchen carbon black, thermal black, lamp black, oil smoke, pine smoke, animal black or vegetable black. According to the present invention, furnace carbon black is preferred in view of light shielding properties, cost and physical properties. On the other hand, acetylene carbon black or ketchen carbon black, which is modified by-produced carbon black, while costly, is preferred in view of anti-static properties and for improving light-shielding properties. These two may be used as a mixture depending on the desired properties.

Of the carbon blacks, those having the light shielding performance, furnace carbon blacks having any pH value as measured according to JIS K6221 of 6.0 to 9.0. preferably 6.5 to 8.5, any mean particle size as measured by an electron microscope of 10 to 120 μm and preferably 12 to 70 μm, in particular those having in addition a value of volatile components as measured according to JIS K6221 of not higher than 2.0% and a DBP oil absorption value as measured by the oil absorption amount method A of not higher than 50 ml/100 g, are preferred in that, when these carbon blacks are used in a completely light-shielding packaging material for a photographic material, in the following various points of view: There is no risk of generation of fog on the photographic photosensitive material, such that photosensitivity is increased or decreased only to a small extent; the light-shielding performance is high and, if the carbon blacks are added to the resin composition of the present invention, there is no risk of formation of pinholes by carbon black aggregation or fish eyes. The channel carbon black is costly and moreover the volatile components as measured by JIS K6221 mostly exceeds 5.0% to produce fog on the photosensitive material, so that certain limitations are imposed on the usage and application. Thus, selection should be made after searching into the effect on the photographic performance, such as the sort or sensitivity of the photosensitive material or the sensitizing pigment contained therein. If the sulfur content in the method for measurement according to ASDM D1619 of 0.9% or less, preferably 0.7% or less and more preferably 0.5% or less is used, photographic performance is not affected during prolonged storage for two years or longer.

Preferred commercial carbon blacks may be enumerated by carbon blacks of Mitsubishi. Kasei, #20(B), #30(B), #33(B), #44(B), #45(B), #50, #55, #100, #600, #950, #1000, #2200(B), #2400(B), # MA8, MA11 or MA100. Overseas products include those of Cabott, Black pearls 2,46, 70, 71, 74, 80, 81, 607; Regal 300, 330, 400, 660, 991 SRF-S; Vulcan 3, 6; Sterling 10, SO, V, S, FT-FF or MT-FF. Other examples include those of Ashland Chemical, United R, BB, 15, 102, 3001, 3004, 3006, 3007, 3008, 3009, 3011, 3012, XC-3016, XC-3017 and 3020, only by way of illustration.

The amount of addition of the light shielding material to the outer thermoplastic resin film is any value of 0.05 to 29 wt %, preferably 0.1 to 20 wt %, more preferably 0.5 to 15 wt % and most preferably 1.0 to 7.0 wt %, while that of the light shielding material to the outer thermoplastic resin film is any value of 0.05 to 37 wt %, preferably 0.1 to 30 wt %, more preferably 0.5 to 20 wt % and most preferably 1.0 to 7.0 wt %. The light-shielding material is preferably coated on its surface with a known surface coating material of various sorts for improving dispersibility.

Of various methods for assorting the light-shielding material, a master batch method is preferred in view of cost and prevention of pollution in the working sites. There are known a method of dispersing the carbon black in a solution of a polymer in an organic solvent for producing a master batch of a polymer-carbon black, as disclosed for example in JP Patent Kokoku JP-B-40-26196, and a method of dispersing the carbon black in polyethylene for producing a master batch, as disclosed for example in JP Patent Kokoku JP-B-43-10362. The light shielding material preferred next to carbon black is an inorganic solvent having a refractive index as measured by the oil immersion method of Larsen of not less than 1.50, preferably not less than 1.8, more preferably not less than 2.0 and most preferably not less than 2.5. In particular, zinc oxide with a refractive index of 2.37 and titanium oxide with a refractive index of not less than 2.5 are preferred.

For preventing lowering in photographic performance due to thermal deterioration of resin and generation of pinholes caused by fish-eyes or non-uniform agglomeration spots (aggregated uneven defects), it is preferred to add an anti-oxidant. The following are representative examples of the anti-oxidant. One or more of these anti-oxidants may be used, while the anti-oxidants are not limited to the following.

Phenolic anti-oxidants: 6-t-butyl-3-methylphenyl derivatives, 2.6-di-t-butyl-p-cresol, 2,6-t-butyl-4-ethyl phenol, 2.2'-methylenebis-(4-ethyl-6-t-butyl phenol), 4.4'-butylidenebis(6-t-butyl-m-cresol), 4.4'-thiobis(6-t-butyl-m-cresol), 4.4'-dihydroxy diphenyl cyclohexane, alkylated bisphenol, styrenated phenol, 2.6-di-t-butyl-4-methyl phenol, n-octadecyl-3-(3'.5'-di-t-butyl-4'-hydroxy phenyl) propionate, 2.2'-methylenebis(4-methyl-6-t-butyl phenol), 4.4'-thiobis(3-methyl-6-t-butylphenyl), 4.4'-butylidenebis (3-methyl-6-t-butylphenol), stearyl-β(3.5-di-4-butyl-4-hydroxy phenyl)propionate, 1.1.3-tris(2-methyl-4-hydroxy-5-t-butylphenyl)butane, 1.3.5 trimethyl-2.4.6-tris(3-5-di-t-butyl-4hydroxybenzyl)benzene, tetrakis [methylene-3(3'.5'-di-t-butyl-4'-hydroxyphenyl)propionate]methane.

Ketone amine condensation type anti-oxidants: 6-ethoxy-2.2.4-trimethyl-1.2-dihydroquinoline, 2.2.4-trimethyl-1.2-dihydroquinoline polymer, and trimethyl dihydroquinoline derivatives.

Allylamine-based antioxidants: phenyl-α-naphthylamine, N-phenyl-β-naphthylamine, N-phenyl-N'-isopropyl-P-phenylene diamine, N.N'-diphenyl-P-phenylene diamine, N.N'-di-β-naphthyl-P-phenylene diamine, N-(3'-dihydroxy butylidene)-1-naphthylamine.

Imidazole based antioxidants: 2-mercapto benzoimidazole, zinc salts of 2-mercapto benzoimidazoles, 2-mercapto methyl benzoimidazole.

Phosphite-based anti-oxidants: alkylated allyl phosphite, diphenyl isodecyl phosphite, tris(nonylphenyl)phosphite sodium phosphite, trinonyl phenyl phosphite, triphenyl phosphite.

Thiourea-based antioxidants: thiourea derivatives, 1.3-bis (dimethylaminopropyl)-2-thiourea.

Other anti-oxidants useful against air oxidation include dilauryl thiodipropionate.

The followings are typical commercially available anti-oxidants.

Phenolic anti-oxidants: SUMILIZER BHT BP-76, WXR, GA-80 and BP-101 (SUMITOMO), IRGANOX 1076, 565, 1035, 1425WL, 3114, 1330 and 1010 (CIBA-GEIGY), MARK AO-50,-80, -30, -20, -330 and -60 (ADEKA ARGUS), and TOMINOX SS, TT (YOSHITOMI), IONOX WSP (ICI), SANTONOX (MONSANTO), ANTAGECRYSTAL (KAWAGUCHI), NOCLIZER NS-6 (OUCHI SHINKO), TOPANOL CA (ICI), CYANOX 1790 (ACC).

Phosphorus-based anti-oxidants: IRGAFOS 168 (CIBA-GEIGY), WESTON 618 (BORGWARNER), MARK 2112, PEP-8, PEP-24G, PEP-36 (ADEKA ARGUS), ULTRANOX 626 (BORGWARNER), HGS (SANKO).

Thio-ether based anti-oxidants: DLDTP "YOSHITOMI", DMTP "YOSHITOMI", DSTP "YOSHITOMI"; SUMILIZER TPL, TPM, TPS, TP-D (SUMITOMO); ANTIOX L, M, S (NICHIYU), SENNOX 412S (CIPRO); MARK AO-412 S, AO-23, 329K, 260, 522A (ADEKA ARGUS), SANDSTABP-EPQ (SAND), IRGAFOS P-EPQ FF (CIBA-GEIGY), IRGANOX 1222 (CIBA-GEIGY), WESTON 399 (BORGWARNER).

Metal inactivators: NAUGARD XL-1 (UNIROYAL), MARK CDA-1, CDA-6 (ADEKA ARGUS), LRGANOX MD-1024 (CIBA-GEIGY), CUNOX (MITSUI-TOATSU).

Most preferred anti-oxidants are phenolic anti-oxidants. Examples of marketed anti-oxidants include IRGANOX 1076, 1010 of CIBA-GEIGY and SUMILIZERs BHT, BH-76, WX-R and BP-101 of SUMITOMO Kagaku K.K. Two or more phenolic anti-oxidants and/or phosphorus-based anti-oxidants are preferably used in a mixture for improving the anti-oxidation effect. It is most preferred to use them in combination with carbon black since not only the ant-oxidation effect but also the resin coloration defect hiding effect is displayed. The amount of addition of the anti-oxidant is generally 0.0001 to 1.0 wt %, preferably 0.0005 to 0.8 wt %, more preferably 0.001 to 0.5 wt % and most preferably 0.005 to 0.3 wt %. If the amount of addition is less than 0.0001 wt %, there is poor effect of addition, whereas, if it exceeds 1.0 wt %, the photographic performance is deteriorated.

Most preferred anti-oxidants for the present invention are hindered phenolic antioxidants. The followings are most preferred hindered phenolic anti-oxidants.

1,3,5-trimethyl 2,4,6-tris(3,5-di-tert-butyl-4-hydroxybenzyl) benzene, tetrakis [methylene-3-(3'.5'-di-tert-butyl-4'-hydroxyphenyl)propionate]methane, octadecyl-3,5-di-tert-butyl-4-hydroxy-hydrocinnamate, 2,2', 2'-tris[(3,5-di-tert-butyl-4-hydroxyphenyl)propionyloxy] ethyl isocyanurate, 1,3,5-tris(4-tert-butyl-3-hydroxy-2,6-dimethylbenzyl]isocyanurate, tetrakis(2,4-di-tert-butylphenyl)4,4'-biphenylene diphosphite, 4,4'-thiobis-(6-tert-butyl-o-cresol), 2,2'-thiobis-(6-tert-butyl-4-methylphenol), tris-(2-methyl-4-hydroxy-5-tert-butylphenyl)butane, 2,2'-methylene-bis-(4-methyl-6-di-tert-butylphenol), 4,4'-methylene-bis-(2,6-di-tert-butylphenol), 4,4'-butylidenebis-(3-methyl-6-tert-butylphenol), 2,6-di-tert-butyl-4-methylphenol, 4-hydroxy.methyl-2,6-di-tert-butylphenol, 2,6-di-tert-4-n-butylphenol, 2,6-bis-(2'-hydroxy-3'-tert-butyl-5'-methylbenzyl)-4-methylphenol, 4,4'-methylene-bis-(6-tert-butyl-o-cresol), 4,4'-butylidenebis (6-tert-butyl-o-cresol), 4,4'-butylidene-bis(6-tert-butyl-m-cresol), 3.9bis{1.1-dimethyl-2-[β-(3-t-butyl-4-hydroxy-5-methylphenyl)propionyloxy]ethyl}2,4,8,10-tetraoxaspiro [5,5]undecane.

Of these, the hindered phenolic anti-oxidants having melting point of 100° C. or higher, in particular, 120° C. or higher, are preferred. The above anti-oxidants are preferably used with phosphorus-based anti-oxidants for utmost effects. If the phenolic anti-oxidants, phosphorus-based anti-oxidants and hydrotalcite-based compounds are used in combination, good photographic performance may be realized without rusting the molding machine. Moreover, it becomes possible to prevent the thermoplastic resin from being thermally deteriorated in physical strength and to prevent coloration defects caused by resin burning or non-uniform agglomeration, thus assuring desirable properties of the completely light-shielding packaging material for a photosensitive material.

Table 1 shows a typical method for producing a polyethylene-based (or polyethylenic) resin. However, the methods for producing the polyethylene-based resin is not limited to that shown in Table 1.

TABLE 1

| Method for Production | | Condition Temperature(° C.) | Pressure(ATM) |
|---|---|---|---|
| High Pressure method | | 120–300 | 1,500–3,000 |
| Medium to Low Pressure Method | (a)Solution Polymerization | 125–250 | 30–100 |
| | (b)Slurry Polymerization | 30–90 | 0–15 |
| | (c)Gas Phase Polymerization | 80–110 | 7–20 |

Table 2 shows a typical production process, production techniques, corresponding manufacturers and names of products for linear low-density polyethylene, referred to hereinafter as L-LDPE, which is produced or marketed in Japan as a resin for the innermost layer, that is the layer closest to the photosensitive material. However, the production processes for L-LDPE are not limited to those shown in TABLE 2.

TABLE 2

| Production Process | Technology of Production | Manufacturer | Name of Products |
|---|---|---|---|
| Liquid Phase | Solution Method | own technology | Mitsui Sekiyu Kagaku | Ultozex Neozex |

TABLE 2-continued

| Production Process | Technology of Production | Manufacturer | Name of Products |
|---|---|---|---|
| Method | Solution Method DSM | Idemitsu Sekiyu Kagaku | Idemitsu Polyetylene L Moretec |
| | Solution Method Dow,Du'Pont Canada | Asahi Kasei | Dow-Lex Sclair |
| | Slurry Method Converted Medium-to-Low Pressure Method (own technology) | Showa Denko | Showlex Linear |
| | Slurry Method Converted Medium-to-Low Pressure Method (own technology) | Nisseki Kagaku | Linilex |
| Gas Phase Method | UCC | Mitsubishi Yuka Mitsubishi Kasei | Yukalon L-L Novatec-L |
| | UCC | Nippon Unicar | NUC Polyethylene L-L (NUCflex) |
| Improved High Pressure Method | Converted High Pressure Method (CdF) | Sumitomo Kagaku | Sumikasen-L |
| | Converted High Pressure Method (CdF) | TOSO | Nipolon L |
| | Converted High Pressure Method (CdF) | UBE KOSAN | UBE Polyethylene |

The schematics of the feature of the production process for the L-LDPE resin are as follows;
Gas-Phase Method It is publicized that, with this method, a smaller energy quantity is necessary for polymerization. In view of the quality, a sole comonomer susceptible to volatilization needs to be used, thus imposing more limitations than in the case of the solution method. Recently, the latitude of comonomer selection or control range of the molecular weight distribution appears to become wider.
Slurry Method The liquid phase polymerization method employing solvents is classified into a slurry method and a solution method. Although the slurry method employs the solvent, this is of a heterogeneous phase system and the solution in a reaction vessel is low in viscosity. Thus the resin can be produced by a rather compact equipment while solvent removal may be facilitated with advantage. As for reduction in density, the low molecular weight low viscosity polymer is dissolved into the solvent, thus increasing the viscosity of the solvent or expanding and agglomerating the polymer, with a result that limitation is imposed on the production of L-LDPE with a density of 0.930 g/cm$^3$ or less.
Solvent Method In the solution method, polymerization occurs in a solution at a higher temperature for maintaining the state of solution. In view of the quality, the allowable range of density lowering is wider. This process is optimum for polymerization of ethylene with α-olefins with $C_6$ or higher, such as 4-methylpentene-1, hexene-1, octene-1 or decene-1. This process is also optimum for production of L-LDPE resin having a larger α-olefin content (ultra-low-density L-LDPE resin with a density not higher than 0.910 g/cm$^3$.

Improved high-pressure method: The method directly utilizes the conventional high-pressure process to produce the L-LDPE resin at elevated temperatures and pressures using a Ziegler catalyst. The running cost is higher than in the case of the above gaseous phase method, slurry method or the solution method. It is also termed as the converted high-pressure method.

The following methods may be given as the method for producing the multi-layer co-extrusion thermoplastic resin film. However, the methods for producing the multi-layer co-extrusion thermoplastic resin film are not limited to these methods.
Multi-Layer Co-Extruded Inflation Film Molding Method Plastic materials of different colors or different sorts, melted and softened with two or more extruders, are fed to a sole die for an inflation film for producing a multi-layer film by an inflation method. The lamination method may be classified into a system for lamination inside a die and a system for lamination outside a die. The former system is used extensively for lamination of materials which are not soluble with each other. The latter system is such a system in which, for improving bonding strength between different materials, an activating gas is introduced for producing chemical bond into a space between the two films during a period of time before the molten resin exiting the die is unified.
Multi-Layer Co-Extrusion T-Die Film Molding Method This method produces a laminated product from layers of different materials or different colors in extrusion-molding a multi-layer co-extruded film. The multi-layer T-die method is classsified into a single manifold type, multi-manifold type and dual slot manifold type, depending on the T-die type.
Single-Manifold Type There is provided in a T-die field section an adapter for combining plural material flows. The combined materials are enlarged in width by a single manifold so as to be extruded as a multi-layer film or sheet. Substantially no difference is allowable in the melting temperature of the different materials.
Multi-Manifold Type This type has been used from old time for production of the multi-layer T-die film. A number of manifolds equal to the intended number of layers for lamination are provided along the entire width of the die.
Dual-Slot Manifold Type A partition is inserted between two split single manifold dies to provide substantially a multiple manifold. Bonding is done outside the die. The melting temperature differential between the materials can be increased by employing an insulating material for the partition.

For obtaining a multi-layered laminated product having five or more layers, two or more dies are added for increasing the number of layers. Alternatively, a stack plate die is used. The latter method is advantageous over the former in view of lower die cost and facilitated exchange.

There are a T-die method and an inflation method employing a flat die and a circular die, respectively, as a die for a multi-layer co-extruded thermoplastic resin film, respectively, in the above-mentioned multi-layer co-extrusion inflation film molding method and multi-layer co-extrusion T-die film molding method. In any of these cases, the die may be classified into the following three types: a single manifold die combining respective materials upstream of the die (feed-block method), a multi-manifold die combining the materials within the die (in-die bonding method) and a multi-slot die combining the materials on exiting the die (outside-die bonding system). Meanwhile, the outside-die bonding system of the T-die method and the pre-die combining system of the inflation methods are currently out of use. A stack plate die similar to the multi-manifold die has also been developed. By using these dies, composite films or sheets of not less than two sorts/two layers up to approximately four sorts/nine layers can be produced.

Of the polyethylene-based resins in the thermoplastic resin film according to the present invention, that produced using a metal metallocene polymerization catalyst is most desirable since it is inexpensive and superior in film moldability and affects the photographic performance of the photosensitive material, such as fog, sensitivity, gradation and coloration to a lesser extent. However, the polyethylene based resin used in the thermoplastic resin film according to the present invention is not limited to that produced on polymerization using the metal metallocene polymerization catalyst.

Film moldability is significantly influenced by molecular weight distribution (weight average molecular weight, referred to hereinafter as Mw/number average molecular weight, termed as Mn). The molecular weight distribution (Mw/Mn) is a measure for judging the relation between the film moldability and the physical strength. If emphasis is placed on the physical strength and dimensional stability, a polyethylene-based resin with a smaller value of the molecular weight distribution (Mw/Mn), that is a narrower molecular weight distribution, is preferred, whereas, if emphasis is placed on the film moldability, a polyethylene-based resin with a larger value of the molecular weight distribution (Mw/Mn) (i.e., wider molecular weight distribution) is preferred. In the present invention, the molecular weight distribution has been measured by a gel permeation chromatography (GPC) method by WATERS INC. 150-C (column; GMH-XLHT produced by TOSO KK, 8 mm in diameter×3, solvent; 1,2,4-trichlorobenzene, temperature; 135° C., flow rate, 10 ml/min)).

The polyethylene-based resin used in the inflation film molding method (tubular film) or the T-die film molding method (flat film) is of a molecular weight distribution (Mw/Mn) of 1.5 to 15, preferably 1.5 to 12, more preferably 2 to 10 and most preferably 2 to 8. The polyethylene based resin used for a coating film produced by a series of process steps including flowing a polyethylene-based resin composition from a slot die of a melt extruder (T-die) onto a running film or paper substrate for forming a coating which is pressed between a pressure roll and a cooling roll and peeled from the roll after cooling, referred to hereinafter as an "extrusion laminated coated film", has a molecular weight distribution (Mw/Mn) of 4 to 30, preferably 5 to 28, more preferably 6 to 25 and most preferably 7 to 20.

If the polyethylene-based resin film for use in the inflation film molding (tubular film) or in a T-die film molding method (flat film) has a molecular weight distribution (Mw/Mn) less than 1.5, the film becomes costly, while it is poor in the film moldability and the amenability to polymerization thus rasing difficulties in practical utilization. Conversely, if the molecular weight distribution (Mw/Mn) exceeds 15, the physical strength is lowered while stretchability is also lowered such that a tough film (inclusive of a multi-layered co-extruded film) cannot be produced.

If the film obtained by the extrusion lamination method has a molecular weight distribution (Mw/Mn) less than 4 or higher than 30, the film is hardly usable because of unfavorable grades in generation of neck-in and streaks in the molten resin film, draw-down (film rupture) and generation of surging, when evaluated comprehensively in terms of "moldability of coating film".

Of the polyethylene-based resin produced by a variety of polymerization methods in the present invention, those most desirable are the polyethylene-based resin films produced using a metal metallocene polymerization solvent because they scarcely affect photographic performance, such as fog, sensitivity, gradation or coloration, and are superior in the film moldability and physical strength while being inexpensive. These polyethylene-based resins are produced by polymerization using a polymerization catalyst obtained on combining zirconium-based or hafnium-based metallocene disclosed in JP Patent kokai JP-A-60-35006, JP-A-63-501369 or JP-A-3-502710 preferably with methyl aluminoxane for improving catalytic activity.

Within the above-given molecular weight distribution, the following polyethylene-based resins with various values of MFR, density or molecular weight may be used: low-density polyethylene resins, medium-density polyethylene resins or high-density polyethylene resins, ethylene-α-olefin copolymer resins (with α-olefin being any carbon number of $C_3$ to $C_{15}$, preferably $C_4$ to $C_{10}$, more preferably $C_4$ to $C_8$ and most preferably $C_6$ to $C_8$, ethylene-vinyl acetate copolymer resins, ethylene ethyl acrylate copolymer resins, other binary copolymer resins mainly composed of ethylene, ternary copolymer resins mainly composed of ethylene, acid-modified polyethylene-based resins of the polyethylene-based resins (where acids may be unsaturated carboxylic acids and may be those used for modification of polyolefin resins), or mixed resins containing one or more of these polyethylene-based resins and a thermoplastic resin(s).

The weight average molecular weight of the polyethylene based resins prepared by polymerization using the metal metallocene polymerization catalyst is 10,000 to 2,000,000, preferably 20,000 to 1,500,000, more preferably 50,000 to 1,000,000 and most preferably 100,000 to 800,000. If the molecular weight is less than 10,000, the resin cannot be used practically because of shortage in the physical strength, whereas, if the molecular weight exceeds 2,000,000, film molding or preparation by polymerization becomes difficult while the resin becomes costly and hence raises difficulties in manufacture.

The MFR value of the polyethylene-based resin (measured under the condition E of ASTM D-1238) is any value of 0.01 to 350 g/10 minutes, preferably 0.05 to 300 g/10 minutes, more preferably 0.1 to 250 g/10 minutes and most preferably 0.2 to 200 g/10 minutes. If the MFR is less than 0.01 g/10 minutes, film molding becomes difficult even if used as a mixture with resins exhibiting larger values of MFR, and thus, melt fracture is incurred to produce severe surface illeguralities of wavy forms thus lowering the appearance. Moreover, the photosensitive material becomes scored or subjected to fogging due to friction or pressure such that the resin becomes hardly usable. If the MFR value exceeds 350 g/10 minutes, film molding becomes difficult even if the resin is used with other resins having lower MFR values thus raising difficulties in film molding. Moreover, the resin has only poor physical strength and susceptible to hole formation or elongation. In addition, the resin is liable to be torn, and hence is unsuitable for a packaging material or a light-shielding bag for a photosensitive material of the present invention which is in need of the complete light shielding.

The density of the polyethylene-based resin (measured in accordance with ASTM D-1505) is 0.86 g/cm$^3$ to 0.980 g/cm$^3$, preferably 0.87 g/cm$^3$ to 0.97 g/cm$^3$, more preferably 0.88 g/cm$^3$ to 0.96 g/cm$^3$, and most preferably 0.89 g/cm$^3$ to 0.95 g/cm$^3$. If the density of less than 0.86 g/cm$^3$, manufacture by polymerization becomes difficult, and the resin becomes expensive. In addition, the resin cannot be practically used because of pellet blocking. If the density exceeds 0.980 g/cm$^3$, manufacture by polymerization becomes difficult, and the resin becomes expensive. Moreover, molding becomes difficult, while the film tends to be torn longitudinally due to molecular orientation to render the manufacture difficult. On the other hand, the resin is susceptible to hole formation or cleavage such that it is practically unsuitable for a packaging material or a light-shielding bag for a photosensitive material of the present invention which is in need of the complete light shielding.

If disposal by burying as wastes is taken into consideration, decomposable plastics, now being researched or partially introduced into the marketplace, may be utilized. As biologically decomposable polymers, ICI "BIOPOL", UCC "POLYCAPROLACTONE", or a polymer- or starch-containing polyethylenic resin indirectly decomposed by addition of natural or synthetic high molecular materials liable to biological decomposition, may be used. Recently, a chemically synthesized biologically decomposable plastic, which is particularly inexpensive and which can be decomposed by microorganisms into carbon dioxide and water, has recently been marketed. For improving disposability of industrial wastes, it is desirable to add a suitable amount of at least 10 wt % of "BIONOL" produced by SHOWA KOBUNSHI KK (special polyester-based resin chemically synthesized from, for example, dicarboxylic acid) or "MATARBI" produced by NOVAMONT INC. of Italy (a polymer alloy of corn starch and a biologically decomposable modified polyvinyl alcohol) to the resin composition used for the completely light-shielding photosensitive material of the present invention. For improving disposability of industrial wastes, it is particularly desirable to add an arbitrary amount not less than 50 wt % of the above-mentioned biologically decomposable plastics since the layer not in direct contact with the photosensitive material does not affect photographic performance in the case of a multi-layered molded product.

Photodecomposable polymers may also be utilized. For example, an ECO copolymer produced by copolymerization of carbon monoxide with ethylene, into which carbonyl groups are introduced into the main chain during polymerization of polyethylene resin, or a polymer obtained by adding transition metal salts, oxidation promoters or photosensitizers as additives to the base polymer for imparting photodecomposition properties, may also be used. In addition, one or more of decomposable polymers, e.g., a biologically decomposable polymer, a photodecomposable polymer and a polymer soluble in water, may be used in combination (JP-Patent Kokai JP-A-3-129341).

In the present invention, low-density homopolyethylene resins (LDPE resins), middle-density homopolyethylene resins (MDPE resins), L-LDPE resins and propylene-ethylene copolymer resins are preferred among the above polyethylene resins. Of these resins, those employing stereoregular catalysts are desirable since they contain less amounts of catalyst residues which might affect the photographic performance of the photosensitive material. In the case of the thermoplastic resin film, an arbitrary amount ranging from 3 to 99.8 wt %, preferably 5 to 97 wt % and more preferably 10 to 94 wt % of an ethylene copolymer resin is desirably added at least to the inner thermoplastic resin film for improving uniform dispersion of light-shielding materials, such as iron black, aluminum powders, aluminum paste or carbon black, amenability to heat sealing, above all, chronological heat-sealing strength and physical strength.

The followings are typical examples of ethylene copolymer resins. Although one or more of the following ethylene copolymer resins may be used on the side of the photosensitive material or into the thermoplastic reins film disposed on the outer side, the ethylene copolymer resins are not limited to these illustrative examples.

Ethylene-vinyl acetate copolymer resins (referred to hereinafter as "EVA resins"), ethylene-propylene copolymer resins, ethylene-1-butene copolymer resins, ethylene-butadiene copolymer resins, ethylene-vinyl chloride copolymer resins, ethylene-methyl methacrylate resins, ethylene-methyl acrylate copolymer resins; (referred to hereinafter as "EMA resins"), ethylene-ethyl acrylate copolymer resins (referred to hereinafter as "EEA resins"), ethylene-acrylonitrile copolymer resins, ethylene-acrylic acid copolymer resins (referred to hereinafter as "EAA resins"), ionomer resins (resins obtained on cross-linking a copolymer of ethylene-unsaturated acid with a metal, such as zinc), ethylene-α-olefin copolymer resins (L-LDPE resins), ethylene-propylene-butene-1 ternary copolymer resins, and ethylene-propylene elastomers.

The above L-LDPE (linear low density polyethylene) resins are termed third polyethylene resins and are low-cost high-strength resins having the merits of both homopolyethylenes, the low to medium-density and high density polyethylenes, and which can meet the demand of the times, that is saving of energy and resources. This resin is a polyethylene-based resin produced by copolymerizing ethylene and α-olefin with $C_3$ to $C_{15}$, preferably $C_4$ to $C_{10}$, more preferably $C_4$ to $C_8$, and most preferably $C_6$ to $C_8$, and having a short branch on a straight chain. Preferred α-olefins in view of physical strength, cost and polymerizability include butene-1, octene-1, hexene, 4-methyl pentene-1, heptene-1 and decene-1 etc. The density (ASTM D-1505) is generally thought to be on the order of that of the low to medium density homopolyethylene resins. In the present invention, any density ranging from 0.87 to 0.98 $g/cm^3$, in particular from 0.88 to 0.96 $g/cm^3$, is preferred. The MFR value (condition E of ASTM D-1238) is preferably 0.1 to 80 g/10 minutes, in particular 0.3 to 60 g/10 minutes. The polymerization process for the L-LDPE resins include a gaseous phase method employing the medium to low pressure devices, a solution method, a liquid phase slurry method and an ion polymerization method employing an improved high-pressure device.

The followings are illustrative examples of the marketed L-LDPE resins. One or more of these L-LDPE resins may be used in combination. The L-LDPE resins that can be employed are not limited to these illustrative examples.

Ethylene-butene-1 copolymer resins: G-resin and NUC-FLX (UCC), DOW-REX (DOW CHEMICAL), SCLAIR (DU PONT CANADA), MARLEX (PHILLIPS), STAMILEX (DSM), EXCELENE VL (SUMINOTO KAGAKU), NEOZEX (MITUI PETROCHEMICALS), MITSUBISHI POLYETHY-LL (MITSUBISHI YUKA), NISSEKI LINILEX (NIPPON PETROCHEMICALS), NUC POLYETHYLENE-LL (NIPPON UNICAR), and IDEMITSU POLYETHYLENE-L (IDEMITSU PETROCHEMICALS).

Ethylene-hexene-1 copolymer resins: TUFLIN (UCC), TUFT HENE (NIPPON UNICAR).

Ethylene-octene-1 copolymer resins: ULTOZEX (MITSUI PETROCHEMICALS).

Ethylene-octene-1 copolymer resins: STAMILEX (DSM), DOW-LEX (DOW CHEMICALS), SCLAIR (DU PONT CANADA) and MORETEC (IDEMITSU PETROCHEMICALS).

Of the above L-LDPE resins, those most preferred as an inflation film as regards physical strength, heat-sealing strength and film moldability, are those produced by the liquid phase process and the gas phase process and having an MFR value (measured under the condition E of ASTM D-1238 or under condition 4 of JIS K-7210 at a test temperature of 190° C. and under a test load of 2.16 kgf) of 0.1 to 10 g/10 minutes, preferably 0.2 to 7 g/10 minutes and more preferably 0.3 to 5 g/10 minutes, a density (measured according to JIS K6760 or ASTM D-1505) of 0.870 to 0.950 g/cm$^3$, preferably 0.880 to 0.940 g/cm$^3$ and most preferably 0.890 to 0.930 g/cm$^3$, and an olefin with any number of carbon atoms of $C_3$ to $C_{12}$, preferably $C_4$ to $C_{10}$ and more preferably $C_6$ to $C_8$.

In case the packaging material for the photosensitive material is an inflation molded article, preferred illustrative commercial articles include ULTZEX of MITSUI PETROCHEMICALS KK in which $C_6$ 4-methylpentene-1 is introduced as an olefin side chain into polyethylene, MORETEC of IDEMITSU PETROCHEMICALS in which $C_8$ octene-1 is introduced as the olefin side chain, STAMILEX of DOW CHEMICALS and DOW-LEX of DOW CHEMICALS. These four products are L-LDPE resins obtained by the liquid phase slurry method process.

Preferred illustrative commercial articles, produced by the low-pressure gas-phase process, include TUFLIN produced by UCC and TUFTHENE produced by NIPPON UNICAR INC.

Since various catalysts are used for polymerization of these ethylene-α-olefin copolymer resins, there are occasions wherein these catalysts are contained as residues in the ethylene-α-olefin copolymer resins, which may offer many harms such as affecting photographic performance for the photosensitive materials, attacking the molding machine or attacking aluminum powders (including aluminum paste). For preventing these harmful operations, one or more of metal salts of various fatty acids are added in optional amounts, such as 0.005 to 10.0 wt %, preferably 0.01 to 5.0 wt %, more preferably 0.03 to 3 wt % and most preferably 0.05 to 1.5 wt %. If one or more of the metal salts of various fatty acids and one or more of hydrotalcite compounds are used in combination, the effect of preventing the above harmful operations is exhibited synergistic. If the amount of addition of the metal salts of the fatty acids is less than 0.005 wt %, the above effect of preventing the above harmful operations is not exhibited. Conversely, with the amount of addition of the metal salts exceeding 10.0 wt %, there are produced slip between the screw and the resin composition, and foaming.

An acid-modified polyolefin resin, which is superior in surface coating effect for the light-shielding material and miscibility with both the thermoplastic resin and the miscibilizer, is preferably added to at least one of thermoplastic resin films disposed on the side of photosensitive material and outwardly of the photosensitive material. This acid-modified polyolefin resin is a modified polyolefin resin obtained on graft modification of the polyolefin resin and the unsaturated carboxylic acid, and may be enumerated by, for example, the graft modified polyethylene resin, graft modified polyethylene resin, graft modified polypropylene resin, graft modified ethylene copolymer resin (EVA resin, EEA resin, L-LDPE resin, EMA resin or polyolefin elastomer).

0.5 to 40 wt %, preferably 1 to 35 wt % and more preferably 2 to 30 wt % of the acid-modified polyolefin resin is preferably contained in the packaging material for the photosensitive material for optimizing uniform dispersion of the light-shielding material such as carbon black or aluminum powders and for reducing formation of micro-grids while improving physical strength. If the amount of addition is less than 0.5 wt %, the effect of kneading is not displayed thus increasing costs. If the amount of addition exceeds 40 wt %, the photographic performance of the photosensitive material is lowered, while the effect of increasing the amount of addition is scarcely displayed resulting in an increased cost.

Unsaturated carboxylic acids, graft-modified with the polyolefin resins, are generic terms inclusive of derivatives thereof, and may be enumerated by the following illustrative compounds: acrylic acid, methacrylic acid, maleic acid, fumaric acid, itaconic acid, tetrahydrophthalic acid, mesaconic acid, angelic acid, citraconic acid, crotonic acid, isocrotinic acid, nadic acid, (endo-cis-bicyclo [2,2,1]hepto-5-en-2,3dicarboxylic acid), maleic anhydride, citraconic anhydride, itaconic anhydride, methyl acrylate, methyl methacrylate, ethyl acrylate, ethyl methacrylate, butyl acrylate, butyl methacrylate, glycidyl acrylate, glycidyl methacrylate, monoethyl maleinate, diethyl maleinate, monomethyl fumarate, dimetyl fumarate, diethyl itaconate, acrylic amide, methacrylic amide, maleic acid monoamide, maleic acid diamide, maleic acid-N-monoethylamide, maleic acid-N,N-diethylamide, maleic acid-N-monobutylamide, fumaric acid monoamide, maleic acid-N, N-dibutylamide, fumaric acid diamide, fumaric acid-N-monoethylamide, fumaric acid-N,N-diethylamide, fumaric acid-N-monobutylamide, fumaric acid-N,N-dibutylamide, maleimide, monomethyl maleinate, dimethyl maleinate, potassium methacrylate, sodium acrylate, zinc acrylate, magnesium acrylate, calcium acrylate, sodium methacrylate, potassium acrylate, potassium methacrylate, N-butylmaleimide, N-phenylmaleimide, malenyl chloride, glycidyl maleate, dipropyl maleinate, acotinic acid anhydride, and sorbic acid, alone or in mixture. Of these, acrylic acid, maleic acid, maleic anhydride and nadic acid, in particular maleic anhydride, are preferred.

There is no particular limitation to the methods for graft modification of unsaturated carboxylic acids in the modified polyolefinic resins. Examples of these methods include a method for carrying out the reaction in the melted state, as shown in JP Patent Kokoku JP-B-43-27421, a method for carrying out the reaction in the state of solution, as shown in JP Patent Kokoku JP-B-44-15422 and a method for carrying out the reaction in the melted state, as shown in JP Patent Kokoku JP-B-43-18144, and a method for carrying out the reaction in the gas phase state, as shown in JP Patent Kokoku JP-B-50-77493.

Of these methods, the melting kneading method employing an extruder is desirable since it is simplified and inexpensive.

The amount of use of the unsaturated carboxylic acids is preferably an arbitrary value ranging from 0.01 to 20 parts by weight and preferably 0.2 to 5 parts by weight to 100 parts by weight of the polyolefin resin base polymer (various polyethylene resins, various polypropylene resins, various polyolefin copolymer resins, α-olefin copolymer resins, such as polybutene-1 resins, poly-4-methylpentene-1 and copolymer resins thereof).

Organic peroxides, for example, are used for accelerating the reaction of the polyolefin resin with unsaturated carboxylic acid. Examples of these organic peroxides include organic peroxides, such as benzoyl peroxide, lauroyl peroxide, azobis isobutylonitrile, dicumyl peroxides, α, α' bis(t-butyl peroxyisopropyl)benzene, 2,5-dimethyl-2,5-di(t-butylperoxy) hexane, 2,5-dimethyl-2,5-di(t-butylperoxy) hexine, di-t-butyl peroxide, cumenhydroperoxide, t-butyl hydroperoxide, dicumyl peroxide, t-butyl peroxylaurate, t-butylperoxybenzoate, 1,3bis(t-butylperoxyisopropyl) benzene, cumenhydroperoxide, di-t-butyl-diperoxy phthalate, t-butyl peroxy maleic acid, isopropyl percarbonate, azo compounds such as azobis isobutyronitrile and inorganic peroxides such as ammonium persulfate, alone or in combination. These are merely illustrative. Most preferred are those having a decomposition temperature of 170 to 200° C., such as di-t-butyl peroxide, dicumyl peroxide, 2,5-dimethyl-2,5di(t-butylperoxy)hexane, 2,5-dimethyl-2,5di(t-butylperoxy) hexine and 1,3-bis(t-butylperoxy isopropyl) benzene.

Although there is no limitation to the amount of addition of these peroxides, it is an arbitrary amount ranging between 0.005 to 5 parts by weight and preferably 0.01 to 1 part by weight based on 100 parts by weight of the polyolefin resin.

The following are typical examples of the marketed acid-modified polyolefin resins.

N-POLYMER (NIPPON PETROCHEMICALS KK), ADMER (MITSUI PETROCHEMICALS KK), ER RESIN (SHOWA DENKO KK), NOVATEC-AP (MITSUBISHI KASEI KOGYO KK), MODIC (MITSUBISHI YUKA KK), NUC-ACE (NIPPON UNICAR KK), UBE BOND (UBE KOSAN KK), MERCEN M (TOSO KK), BONDINE (SUMITOMO KAGAKU KOGYO KK), CMPS (MITSUI-DU PONT CHEMICAL KK), DEXON (EXON), HA series (TOA NENRYO KOGYO KK), and MITSUI LONPLY (MITSUI TOATSU KAGAKU KK).

The recently marketed ultra-low-density straight-chain low-density polyethylene resins, with a density of less than 0.910 g/cm$^3$ has a high physical strength and superior film moldability. It is a thermoplastic resin of an ethylene-α-olefin copolymer resin. This is a resin decreased in density by increasing the content of α-olefin to a value of 5 mol % or higher which is a value larger than that of the usual L-LDPE resin. For securing physical strength and film moldability, the MFR (Condition E of ASTM D-1238) is 0.1 to 30 g/10 minutes, preferably 0.2 to 20 g/10 minutes, the density (ASTM D-1505) is of an arbitrary value ranging from 0.850 to 0.909 g/cm$^3$ and preferably from 0.870 to 0.905 g/cm$^2$ and the molecular weight distribution (measured by GPC) is of an arbitrary value between 1.1 and 10, preferably 1.5 and 7, more preferably 1.8 and 5, and most preferably 2 and 4. Representative examples of marketed goods include NUC-FLX of UCC and Excellene VL of SUMITOMO KAGAKU KK. These ultra-low-density straight-chained polyethylene resins are desirable in that they improve dispersibility of light-shielding materials, such as aluminum powders end carbon black, as well as the physical strength of the packaging material for the photo-sensitive material (the articles of the two companies use butene-1 with 4 carbon atoms as α-olefin).

If these ultra-low-density straight-chained polyethylene resins are used as a thermoplastic resin film, the content thereof in the thermoplastic resin is 1 to 90 wt %, preferably 3 to 80 wt %, more preferably 5 to 70 wt % and most preferably 7 to 60 wt %, while one or more of the lubricant, anti-blocking agent, light-shielding material and the high-density polyethylene resin are used in conjunction. This gives a molded film product free of blocking and superior in physical strength, such as tearing strength, amenability to heat-sealing (such as hot-tack properties, sealing of foreign matter and chronological heat sealing strength maintaining properties), and in dispersibility of light-shielding substances such as carbon black.

Similarly to other vinyl polymer resins, polypropylene resins exhibit toughness. The polypropylene resins marketed and used as plastics in general are isotactic polyproylene resins. The polypropylene resins include, besides homopolymers, random copolymers and block copolymers with ethylene which are both used extensively. It should be noted that the block copolymers are not literary block copolymers but are composed of a homopolymer segment consisting only of propylene and an elastomer segment made up of an ethylene-propylene copolymer. There is also a polypropylene resin composed of the homopolymer or the copolymer as the base which is fortified with a variety of inorganic substance. The polypropylene resin having the lowest density among the general-purpose plastics has a melting point as high as 160 to 170° C. and hence is suited to use at higher temperatures. However, it has a defect that it becomes brittle at lower temperatures because the glass transition temperature is near the ambient temperature. The copolymer has been developed for overcoming this defect. The block copolymer can be used upto a low temperature range substantially equivalent to the polyethylene resin, although the random copolymer is not so extensive. This feature can be realized without losing the high temperature characteristics of the polypropylene resin. The polypropylene resin fortified with the inorganic material is improved in its characteristics under high temperature and under high load.

The polypropylene resin is prepared using mainly a Ziegler catalyst (Ti-based catalyst) by polymerizing propylene under elevated temperature and pressure of 50 to 80° C. and 5 to 35 kg/cm$^2$. The random copolymer is obtained by co-existence of a small amount of ethylene (or other α-olefin). The block copolymer is obtained by first polymerizing the propylene homopolymer and subsequently polymerizing ethylene. Addition and kneading of rubber such as EPM in melted state is resorted to extensively. The polypropylene resin fortified with the inorganic material can be produced by melting and kneading the polypropylene resin prepared by polymerization and various inorganic substances using an extruder.

Examples of the commercial names and manufacturers of the polypropylene resin include: MITSUI NOBRENE (MITSUI TOATSU KAGAKU), MITSUBISHI NOBRENE (MITSUBISHI YUKA), SUMITOMO NOBRENE (SUMITOMO KAGAKU KOGYO KK), CHISSO POLYPRO (CHISSO PETROCHEMICALS), MITSUI SEKIYU KAGAKU POLYPRO (MITSUI PETROCHEMICALS), UBE POLYPRO (UBE KOSAN KK), SHOW AROMER (SHOWA DENKO), TOKUYAMA POLYPRO (TOKUYAMA SODA), TONEN POLYPRO (TONEN PETROCHEMICALS), IDEMITSU POLYPRO (IDEMITSU PETROCHEMICALS), and NOVATEC-P (MITSUBISHI KASEI KOGYO).

Representative examples of the commercial names and the anti-static agents are as follows: Nonionic: T-B103 and T-B104 (MATSUMOTO YUSHI as alkyl amides; ARMOSTAT 310 (LION YUSHI) as polyoxyethylene alkylamine (laurilic amine); ARMOSTAT 400 (LION YUSHI) as tertiary amine (laurilic amine); ARMOSTAT 410 (LION YUSHI) as N, N-bis(2-hydroxyethyl cocoamine); ANTI-STATIC 273C, 273 and 273E (FINE ORG. CHEM) as tertiary amine; BELG. P654 and 049 as N-hydroxy hexadecyl-di-ethanolamine and N-hydroxy octadecyl-di-ethanolamine (NATIONAL DIST) and the like.

The fatty acid amide derivatives may be enumerated by, for example, hydroxy stearic acid amide, oxalic acid-N', N-distearil amide butyl ester, while polyoxyethylene alkyl amides may be TB-115(Matsumoto Yushi), ELEGAN P100 (NIPPON YUSHI), ERIKU SM-2 (Yoshimura Yukagaku) etc.

There are polyoxyethylene alkylether, RO(CH$_2$CH$_2$)$_n$H, polyoxyethylene alkylphenylether, as ether type, REGIA-STAT 104, PE 100, 116 to 118, REGISTAT PE 132, 139 (DAIICHI KOGYO SEIYAKU), ELEGAN E115 and CHEMISTAT 1005 (NIPPON YUSHI), ERIK BM-1 (YOSHIMURA YUKAGAKU), and Electro-Stripper TS, TS2, 3, 5, EA, EA2, 3 (KAO SEKKEN) etc.

The polyhydric alcohol ester type may be enumerated by, for example, mono-, di- or tri-glyceride of stearic acid or hydroxystearic acid, MONOGLY (NIPPON SHONO), TB-123 (MATSUMOTO YUSHI), REGISTAT 113 (DAIICHI KOGYO SEIYAKU), and sorbitan fatty acid ester, as glycerine fatty acid ester; ERIK BS-1 (YOSHIMURA YUKAGAKU), as a special ester, and British cellophane as 1-hydroxyethyl-2-dodecyl glyoxazoline.

Anionic type: there are, for example, alkyl sulfonate, $RSO_3Na$, alkylbenzene sulfonate, alkyl sulfate and $ROSO_3Na$ as a sulfonic acid type. There is, for example, alkyl phosphate as a phosphoric acid ester type.

Cationic type: there are, for example, REGISTAT PE 300, 401, 402, 406 and 411 (DAIICHI SEIYAKU KOGYO) as amide type cation, while there are, for example, quaternary ammonium chloride, quaternary ammonium sulfate, as quaternary ammonium salt, CATIMIN CSM-9 (YOSHIMURA YUKAGAKU), CATANAC 609 (AMERICAN CYANAMIDE), DENON 314C. (MARUBISHI YUKA), ARMOSTAT 300 (LION YUSHI), 100V (ARMOR), Electronic-Stripper (KAO SEKKEN), and CHEMISTAT 2009A (NIPPON YUSHI) as quaternary ammonium nitrate; and CATANAC.SN (AMERICAL DISANAMIDE) as stearamide propyl dimethyl-β-hydroxy ethyl ammonium nitrate.

Ampho-ionic system: there are, for example, REOSTAT 53, 532 (LION YUSHI), AMS 53, 303, 313 (LION YUSHI), as an imidazoline type, while there are AMS 576 (LION YUSHI), REOSTAT 826, 923 (LION YUSHI), and (RNR' $CH_2CH_2CH_2NCH_2COO)_3Mg$, (R, R'=H or $(CH_2)mCOO$—) (LION YUSHI) as metal salt type. There are also an alkyl betaine type, an alkyl imidazoline type and an alkyl alanine type.

Electrically conductive resins: there are a polyacrylic acid type cation and a polyacrylic acid type cation etc.

Others: there are Registat 204, 205 (DAIICHI KOGYO SEIYAKU), ELEGAN 2E, 100E (NIPPON YUSHI), CHEMISTAT 1002, 1003, 2010 (NIPPON YUSHI), ERIK 51 (YOSHIMURA YUKAGAKU), and ALROMINE RV-100 (GEIGY) etc. Of the above enumerated anti-static agents, non-ionic anti-static agents are most preferred because they affect photographic performance or human health only to a lesser extent and exhibit significant static mark preventative effect.

The amount of addition of the anti-static agent is preferably 0.001 to 5.0 wt %, more preferably 0.05 to 3.0 wt % and most preferably 0.1 to 1.5 wt %. If the amount of addition is less than 0.01 wt %, the effect of addition cannot be displayed, but merely the kneading cost is increased. If the amount of addition exceeds 5.0 wt %, slipping between the molten resin and the extruder screw tends to be produced, resulting in instable amount of the extruded resin. Moreover, stickiness or bleed-out tends to occur with lapse of time after molding.

Other preferred embodiments of the present invention and the heat-sealing method for producing the hermetically sealed bag are hereinafter explained merely by way of illustrative examples.

One or more of the lubricant and the surfactant is added in an arbitrary amount ranging from 0.01 to 10 wt % to the innermost layer of the light-shielding bag for the photosensitive material according to the present invention, and at least one surface layer of the photosensitive material (protective layer, if not found photosensitive layer or back coat layer) to form a light-shielding plate for the photosensitive material. This improves prevention of static marks, introducing/exiting performance of the photosensitive material relative to the light-shielding bag, preventing of scratches and prevention of blocking between the surface layer of the photosensitive material and the innermost layer of the light-shielding bag beyond expectation as compared to the case in which the agents are added only to the innermost layer of the light-shielding bag. The amount of addition of the lubricant and/or the surfactant to the innermost layer of the light-shielding bag can be reduced to one-half or less. Moreover, the lowering in the chronological heat-sealing strength of the light-shielding bag may be prevented to provide a light-shielding bag for the photosensitive material capable of providing complete hermetic sealing and light shielding.

If one or more of the surfactant and the lubricant is added to the innermost layer of the light-shielding bag in an arbitrary amount of 0.01 to 10 wt % for improving the above characteristics, the chronological heat-sealing strength may be prevented from being lowered by adding not less than 3 wt %, preferably not less than 5 wt %, more preferably not less than 10 wt % and most preferably not less than 13 wt % of at least the ethylene copolymer resin to the innermost layer.

One or more of various known lubricants may be added in an amount of 0.001 to 10 wt % to at least one layer of the silver halide photosensitive material made up of plural hydrophilic colloidal layers, while one or more of various known lubricants may be added in an amount of 0.001 to 10 wt % to the heat-sealing layer of the innermost layer of the light-shielding bag for the photosensitive material. This improves dust-proofness antistatic properties, prevention of grazing of the photosensitive material and introducing/exiting performance of the photosensitive material relative to the light-shielding bag beyond expectation. Provision of recessed streaks on the heat-sealing portion for preventing light from intruding via the heat-sealing cross-section can be formed using a multi-point hot plate or a thermal steel belt on the surface of which contacted with the outermost layer are formed plural ribs and recesses extending in the heat sealing direction. This system, however, is merely illustrative, and not limited thereto.

The shape of the recessed streaks may be multi-point seals, transverse seals, corrugated transverse seals, checkerboard pattern seal, mesh seal, modified mesh seal, silk pattern seal and mat seal etc. Of these, the transverse seal (see FIG. 9), checkerboard pattern seal (see FIG. 10), mesh seal (see FIG. 11), silk pattern seal (see FIG. 12) and multi-point seal (see FIGS. 8-*a*, 8-*b* and 8-*c*) are preferred, while the multi-point seal and the transverse seal are most preferred. FIGS. 9 to 12 schematically show the shape of the recessed streaks formed on the heat sealing portion. FIGS. 8*a*, 8-*b* and 8-*c* schematically show a multi-point hot plate for multi-point sealing.

A heat-sealing machine for sealing for production of the above-described hermetic sealing bag is now explained.

The heat-sealing machine is a machine for sealing the bags charged with an article one-by-one. The heat-sealable film may be classified into a single-layer film (formed of low-density polyethylene, high-density polyethylene, L-LDPE, polypropylene or vinyl chloride), a multi-layered film (a film obtained on laminating one or more flexible sheets selected from among cellophane, uni- or bi-axially molecular-oriented (inclusive of stretched) synthetic resin films, synthetic resin films having metal or inorganic materials deposited thereon, cloths or aluminum foils, via an adhesive layer), multi-layered co-extruded films, and a film obtained by laminating one or more of the above flexible sheets on the multi-layered co-extruded film via an adhesive layer. These may be used according to usage or application.

The heat-sealing method is as follows: A thermoplastic resin film is clamped from both sides for heat-sealing under heating and pressure application. The method may be classified into an impulse sealing method of pressing the film by applying a pre-set voltage across a nichrome wire for a pre-set time, a heat (hot) plate method of pressure bonding the film by a plate-like member having an enclosed heater, and a method of indirectly heating the film and subsequently pressing the film after melting. There are also a method employing an ultrasonic wave, high frequency and sizing (adhesives). In combination with a sealing block, nichrome wire-silicone rubber (sealing block), a heat plate-silicone rubber and heat plate/heat plate, may also be used.

The heat-sealing machines will be explained from a manual type to an automatic type and special machines. Of course, the heat sealing machines that can be used in the present invention are not limited to these heat-sealing machine types.

A machine remodelled from a solder iron: sley-type electric iron.

A dedicated type machine tailored to particular application machines which can incorporate motor: The "motor" herein means a power source, such as an electric motor or other power sources driven hydraulically or pneumatically): scissors type, a beak type, T-type, gate type and a nip type.

A tandem-connected continuous sealing units having a transmission system: a crank type, heat-generating roll type and a melt pressure bonding type.

A special sealing machine type: Endless band type, shape disk type, air-evacuating/introducing type.

A heat-sealing machine is desirably such a machine in which, for preventing the outermost layer of the packaging material from becoming deposited to the steel belt or to the hot plate and for completing the innermost layer of the heat fusion bonding portion to a beautiful finish, the hot plate or the hot steel belt and the film are heat-bonded with the interposition of a teflon (polyester) sheet or a teflon-coated sheet exhibiting good peeling properties relative to the outermost layer of the packaging material.

For preventing the light from the heat-sealing cross-section (heat fusion portion) from entering the inside of the hermetical sealing light-shielding bag through light piping, the surface of the heat plate or the heat steel belt contacted with the outermost layer of the packaging material is desirably not smooth but presents numerous protrusions and continuous recessed streaks in the heat-sealing direction. It is also desirable to array the innermost layers of the packaging material between the endless steel belts on which are formed plural recessed streaks in the heat sealing direction in order to carry out the heating, melting and immediate cooling continuously.

Illustrative examples of additives that may be incorporated into the packaging material for the packaging material for the photosensitive material are given below. These additives have been confirmed to be utilizable for the completely light-shielding packaging material for the photosensitive material as a result of selection of the sort and addition amount so as not to affect the photosensitive material, use of the non-toxic reaction realized by the combination with outer agents, and our researches into the layered structure or the resin composition, in which selection has been made from among the reagents (additives) described in the amended supplemented edition of Saishin Ganryo Binran (Recent Manual of Pigments), published on Jan. 10, 1977 by SEIBUNDO-SHIKOSHA, Shinkagaku Index (New Chemical Index) of 1994 issue, published on Jul. 23, 1993 by KAGAKU KOGYO NIPPO SHA, 12394 No KAGAKUSHOHIN (12394 CHEMICAL ARTICLES), published on Jan. 26, 1994 by KAGAKU KOGYO NIPPO SHA, "PLASTIC DATA HANDBOOK", published by KOGYO CHOSA-KAI on Apr. 5, 1984 and in JITSUYO PLASTIC YOGO JITEN (Third Edition of Dictionary of Practical Plastic Data Handbook) by K.K. PLASTIC AGE. The present invention, however, is not limited to these illustrative examples.

A. First Classification (Classification According to Performances For Needs)

There are processing stabilizers as auxiliary agents for processing (anti-oxidation agent, thermal stabilizer and PVC stabilizer), fluidity controller (plasticizer and lubricant), and shape retention agent (mold release agent and contraction preventatives). There are also modifiers, such as stabilizers (as life control agents, anti-oxidants, anti-light stabilizers, combustion retarders, biostabilizers, metal deactivators, deterioration recovering agents), performance improvers (as physical property controllers, such as anti-impact property improving agents, such as various elastomers and L-LDPE resins), fillers, reinforcement agents, colorants, plasticizers, foaming agents, cross-linking agents (organic peroxides), nucleating agents), functional improvers (as function-providing agents, electrical conductivity agent, magnetic agent, anti-static agent and fluorescent accelerators, decomposition accelerators (biological decomposition, light decomposition and thermal decomposition) etc.

B. Second Classification (Classification According to the Attributes Proper to the Agents)

There are, as powder modifiers, a reinforcement agent/filler, nucleating agent, processing agent, powder/powder special structure. There are, as reactivity modifier, cross-linking agents, micromonomers, stabilizers (thermal, light, radiation and biological stabilizers), decomposition accelerators (biological, light and thermal activators). There are, as interface modifiers, a coupling agent, miscibilizers (solubilizers) and plasticizer/solvent. There are, as polymer modifiers, a workability (processability) improver, a performance improver, and an alloy or a blend (performance modifier) etc.

Representative examples of the photosensitive materials, to which can be applied the completely light shielding packaging material for the (photographic) photosensitive materials according to the present invention, are given below.

Photographic Photosensitive Materials

Films for printing, monochromatic and color printing papers, X-ray films, color films (negative and reversal), master plates for printing, DPR photosensitive materials, films and paper sheets for computer aided photo-composing, micro-films, motion picture films, self-developing photosensitive materials, full-color heat-sensitizing paper, and direct-positive type film and paper.

Thermal Developing Photosensitive Material

Thermal developing color photosensitive materials and thermal developing monochromatic photosensitive materials, such as those described in JP Patent kokoku JP-B-43-4921 and JP Patent kokoku JP-B-43-4924, and those described in "Shashin Kagaku No Kiso" (Fundamentals of Photographic Engineering), edited by GIN-EN-SHASHIN, published by CORONA in 1979, pp.553 to 555 and in a journal "RESEARCH DISCLOSURE", June 1978, pp.9 to 15 (RD-17029). In addition, thermal development color photosensitive materials of the transfer system described in the specification of JP-Patents Kokai JP-A-59-12431, JP-A-60-2950 and JP-A-61-52343, and in the U.S. Pat. No. 4,584,267.

The photosensitive and thermally sensitive recording materials: the recording material (inclusive of full-color heat-sensitive paper) exploiting photothermography as described in JP Patents Kokai JP-A-59-190886, JP-A-61-40192, JP-A-61-40193, JP-A-3-72358, JP-A-3-288688 and JP-A-4-28585 etc.

Ziazonium photosensitive materials: 4-morpholino benzene diazonium microfilms, micro-films, films for duplication and master plate materials for printing.

Azides=and Diazide-Based Photosensitive Materials

Photosensitive materials, such as film for duplication and print master materials including p-azido benzoate, 4,4'diazidostilbene.

Quinone Diazide-Based Photosensitive Materials

Photosensitive materials including para-azido benzoate, 4,4'diazidostilbene, such as ortho-quinone diazide, ortho-naphthoquinone azide-based compounds, such as benzoquinone(1,2)-diazide-(2)-4-phenyl sulfonate ester, such as master plate materials for printing, films for duplication or films for intimate contact.

Photopolymers

Photosensitive materials, printing master materials and films for intimate contact including vinyl-based monomers.

Polyvinyl Cinnamic Acid Ester-Based Photosensitive materials

Such as printing films or photoresists for IC.

Other photosensitive materials transmuted or deteriorated by various light beams, oxygen or sulfurous acid gas, such as food (butter, peanuts, margarine, snack food, cake, green tea or laver, medicines (powdered or granulated medicines contained in bags for gastro-enterics, cold or the like), dyes, pigments, chemicals for developing and fixing photographs or toners.

The layers (inner layers) of the packaging material facing the photosensitive materials are bonded to each other to produce a light-shielding bag for a photosensitive material closet to the photosensitive material.

Representative examples of the methods for bonding and hermetically sealing the layers closest to the photosensitive material include a heat plate bonding method (generally termed as "heat-sealing method"), a steel belt bonding method, an impulse bonding method, a residual heat bonding method, an ultrasonic bonding method, a high-frequency bonding method, welding-cut bonding method, a cut-and-seal method, a heat reduction welding method, and bonding methods utilizing various adhesives, such as solvent type adhesives, pressure sensitive adhesives, hot melt adhesives, agglutinating adhesives, paste type adhesives or latex type adhesives.

Of the above adhesive sealing methods, the heat plate bonding method (heat-sealing method), steel belt bonding method, impulse bonding method, ultrasonic bonding method, high-frequency bonding method and the welding-cut bonding method, are preferred. The heat plate bonding method, steel belt bonding method, impulse bonding method and the welding bonding method (inclusive of the cut-and-seal method) are more preferred, and the heat plate bonding method, steel bonding method and the impulse bonding method are most preferred. If the packaging material is formed entirely of the thermoplastic resin layers and the layer closest to the photosensitive material contains not less than 1 wt % of the ethylene copolymer resin, the welding-cut bonding method (inclusive of the cut and -seal method) is one of the most preferred methods.

It is also preferred to interpose a teflon (polyester) sheet or a sheet comprised of a glass cloth coated with teflon exhibiting good heat resistance and good peeling performance relative to the outermost layer from the photosensitive material for preventing the outermost layer from attaching to the hot plate or the thermoplastic resin steel belt during adhesive tight sealing of the packaging material for assuring beautiful finish of the heat fusion adhesive portion of the outermost layer from the photosensitive material.

According to the preset invention, various known adhesive layers may be used in conformity to the adhesive layers. The adhesives used for this adhesive layers may be enumerated by olefinic thermoplastic resins such as various polyethylenes (LDPE, L-LDPE, MDPE OR HDPE etc.) or various polypropylene resins; ethylene copolymer resins such as ethylene-propylene copolymer resins, ethylene-vinyl acetate copolymer resins or ethylene-ethyl acrylate copolymer resins; thermoplastic resins such as ethylene-acrylic acid copolymer resins ionomer resins or ethylene copolymer resins; and heat melt adhesives (extrusion laminate adhesives) etc.

There are also heat melt type rubber based adhesives. As solution type adhesives, there are, for example, a wet laminate adhesive which is an emulsion or latex type adhesive. Illustrative examples of the emulsion type adhesives include emulsions of polyvinyl acetate, vinyl acetate-ethylene copolymers, vinyl acetate-acrylic acid ester copolymers, vinyl acetate-maleic acid ester copolymers, acryl copolymers, and ethylene-acrylic acid copolymers etc. Illustrative examples of the latex type adhesives include rubber latex, such as natural rubber, styrene-butadiene rubber (SBR), acrylonitrile butadiene rubber (NBR) or chloroprene rubber (CR). The dry laminate adhesives include isocyanate based adhesives and urethane-based adhesives. In addition, known adhesives, including hot melt laminate adhesives, pressure sensitive adhesives or heat-sensitive adhesives, obtained by blending paraffin wax, microcrystalline wax, ethylene-vinyl acetate copolymer resin or ethylene-ethyl acrylate copolymer resin, may also be employed.

The polyolefin adhesives for extrusion lamination, particularly desirable for the present invention, include, in addition to the various polyethylene resins, polypropylene resins, polybutylene resins and ethylene copolymers (such as EVE or EEA), ethylene partially copolymerized with other monomers, such as α-olefin, ionomer resins (ionic copolymers) such as "SERLIN" of DU PONT, or "HILAMINE" of MITSUI POLYCHEMICALS, or acid modified resins, such as ADOMERS" of MITSUI PETROCHEMICALS. UV-curable type adhesives have recently come into use. In particular, the LDPE resin, L-LDPE resin or a resin blend of the LDPE resins and L-LDPE resins are desirable because they are inexpensive and superior in laminating performance. The acid-modified resins are desirable for improving the bonding strength. A resin mixture obtained on blending two or more of the above resins to compensate for the defects of various resins is particularly preferred since it is superior in laminating performance. A resin mixture obtained on mixing 10 to 90 wt % of the L-LDPE resin having large neck-in but superior in extendability with 90 to 10 wt % of the inexpensive LDPE resin having small neck-in and superior in melt extrusion properties is particularly desirable since it exhibits all properties required of the extrusion laminate adhesive layer. In particular, a mixture of the LDPE resin or a mixture at a suitable ratio of the LDPE resin or the L-LDPE resin with the acid-modified polyolefin resin is preferred since a desired bonding strength can be realized.

The adhesive layer resulting from the extrusion laminate method using thermoplastic resins has a thickness of, usually 6 to 100 µm, preferably 7 to 50 µm, more preferably 9 to 40 µm. The thickness is defined based on cost, adhesion strength, laminate speed, entire thickness of the laminate etc., and thus the above values are not limitative.

If it is desired to enhance the physical properties, such as longitudinal and transverse tearing strength, impact breakage strength or Gelbotester strength, the peeling strength between two laminated layers, as measured by a peeling test with a peeling angle of 180° by a tester according to ASTM D903, is 300 g/15 mm width or less, preferably 100 g/15 mm width or less and more preferably 50 g/15 mm or less to provide a weaker adhesive layer. However, the peeling strength such that peeling does not occur during the lamination process is required, so that the strength should be not less than 0.1 g/15 mm width, preferably not less than 1 g/15 mm width and more preferably not less than 5 g/15 mm width. The same substantially applies for the blocking bonding strength (the strength is approximately doubled for a width of 30 mm).

For providing the adhesive layer of the weaker bonding strength (referred to as a "weak adhesive layer"), the methods of (i) reducing the thickness of the adhesive layer, (ii) not processing the surface of a bonded article with corona discharge, framing, plasma, ultraviolet rays, electronic ray irradiation, pre-heating or anchor-coating, (iii) lowering the temperature of the adhesive layer, (iv) providing an adhesive layer made up of a resin composition having a weak adhesive strength, (v) providing an adhesive layer made up of two or more resin compositions inferior in miscibility or compatibility, and (iv) providing a multi-layered co-extruded extrusion laminated adhesive layer susceptible to interlayer delamination. These methods may be used alone or in combination, and are not restrictive.

For providing a readily openable packaging material for the photosensitive material or preventing delamination, lamination is via a strong adhesive layer of an arbitrary strength with a bonding strength (as measured by a peeling test with a peeling angle of 180° using a tester provided in ASTM D903) of not less than 350 g/15 mm width, preferably 500 g/15 mm width and more preferably 700 g/15 mm width (it is noted that the strength for the width of 30 mm is approximately doubled). For providing the adhesive layer with the higher bonding strength (referred to as "strong adhesive layer"), e.g., the reverse of the operation for providing the weak adhesive layer may be used.

One of the adhesive resins desirable for providing the strong adhesive layer is, for instance, the above-mentioned acid-modified polyolefin resin. The amount of the acid-modified polyolefin resin contained in the adhesive layer is any value of 3 to 90 wt %, preferably 5 to 70 wt %, more preferably 7 to 60 wt % and most preferably 10 to 50 wt %. If the content is less than 3 wt %, the bonding strength can hardly be increased, whereas, if the amount exceeds 90 wt %, there is no corresponding effect, while simply the cost is raised. Various known additives, such as those mentioned above, may be contained in the adhesive layer. In particular, variety of light-shielding materials, deodorants, odor reducing agents, aromatic agents or deoxygenating agent may be preferably contained in the packaging material for the photosensitive materials of the present invention in view of assuring complete light shielding performance, prevention of bad odors ascribable to the additives in the photosensitive materials and for assuring prolonged quality.

Effect of the Invention

By the basic constitution of the present invention, following meritorious effects are achieved: superior bag-breaking strength and wear and abrasion resistance (dust-proofing properties), superior surface strength, superior bag-making amenability and complete sealing and light shielding for a prolonged period of time as well as superior photographic performance may be assured. In addition, superior recycling performance, discarding performance, low cost, superior physical strength, superior anti-static properties, superior heat-sealing performance, easy inserting/taking out of the photosensitive materials into/out of the bag, superior appearance and superior film moldability (especially in the case of the three-layered co-extrusion) may be realized, while entrance/exiting of the photosensitive material relative to the light-shielding bag may be realized.

Depending on the particular embodiments of the present invention, the following specified effects may be additionally achieved. Since not less than 3 wt % of the L-LDPE resin is contained in the inner most heat sealing layer, the complete sealing and light shielding may be assured without lowering heat sealing performance (strength) for a prolonged period of time despite the accompanying use of the lubricant and/or the anti-static agent. Since the bi-axially stretched polypropylene resin film having a high Young's modulus and a high melting point is laminated as the outer polypropylene-based resin film or as the outer multi-layer co-extrusion film, a superior bag-making performance may be achieved with good appearance with least amount of wrinkles and creases. Moreover, since the Young's modulus is not less than 150 kg/mm$^2$, the bag is not liable to be broken by an external force or on fall down.

It should be noted that modifications obvious in the art can be made without departing from the gist and scope of the present invention herein disclosed and claimed as appended.

What is claimed is:

1. A completely light-shielding packaging material for a photosensitive material comprised of two types of light-shielding thermoplastic resin films of different properties molded separately from each other, one of said resin films being layered towards the photosensitive material and the other resin film being layered outwardly of said photosensitive material via an adhesive layer;

wherein the light-shielding thermoplastic resin film adapted to be outwardly of said photosensitive material is an outward polypropylene thermoplastic resin film, comprising a polypropylene resin film having a Young's modulus in the longitudinal direction of 150 to 600 kg/mm$^2$ and a thickness of 15 to 80 µm, said outward polypropylene resin film being stretched by a factor of 3 to 12 times and 4 to 12 times in the longitudinal and transverse directions, respectively, and containing at least 0.1 to 20 wt % of a light-shielding material, not less than 70 wt % of a polypropylene resin and 0.001 to 5 wt % of a lubricant and/or an anti-static agent, said polypropylene resin consisting essentially of at least one of a homopolypropylene resin having a melt flow rate of 0.5 to 10 g/10 min. and a Vicat softening point of 135 to 160° C. and/or a propylene-α-olefin copolymer resin containing 0.001 to 3 wt % of α-olefin comprising 2 or 4 to 10 carbon atoms; and wherein the light-shielding thermoplastic resin film adapted to be towards said photosensitive material is an inward polyolefin thermoplastic resin film, comprising a polyolefin resin film having a Young's modulus in the longitudinal direction of not higher than 120 kg/mm$^2$ and a thickness of 20 to 150 µm, said inward polyolefin resin film containing at least 0.1 to 30 wt % of a light-shielding material, not less than 3 wt % of an ethylene copolymer resin, 0.001 to 5 wt % of a lubricant and/or an anti-static agent, and not less than 62 wt % of a polyolefin resin;

wherein the polypropylene resin is composed of at least one of a homopolypropylene resin and/or a propylene-α-olefin copolymer resin containing 0.001 to 3 wt % of α-olefin comprising 2 or 4 to 10 carbon atoms, making up the outward polypropylene resin film, said polypropylene resin comprising not less than 70 wt % of a homopolypropylene resin having a melt flow rate of 0.5 to 10 g/10 min, an isotactic index of 93 to 99.5 and a Vicat softening point of 135 to 160° C.; and wherein the inward thermoplastic resin film is a multi-layer co-extruded film inclusive of said inward polyolefin resin film, and is an inward multi-layer co-extruded film, and wherein the innermost layer of the inward multi-layer co-extruded film contains not less than 50 wt % of a heat-sealable resin having a Vicat softening point of not higher than 125° C., said heat-sealable resin being homopolyethylene resin and/or ethylene copolymer resin.

2. The completely light-shielding packaging material as defined in claim 1 wherein said outward polypropylene resin film has a thermal contraction rate of 5±3% at 150° C. in the longitudinal direction.

3. The completely light-shielding packaging material as defined in claim 1 wherein the outward polypropylene resin film has a melting point according to the DSC method of not less than 150° C.

4. The packaging material as defined in claim 3, wherein said outward polypropylene resin film has a higher Vicat softening point by at least 15° C., a higher DSC melting point by at least 10° C., and a higher Young's modulus by at least 30 kg/mm² than those of the inward polyolefin resin film, respectively.

5. The completely light-shielding packaging material as defined in claim 1 wherein the outward thermoplastic resin film is an outward multi-laver co-extruded film which comprises a multi-layer co-extruded film inclusive of said outward polypropylene resin film, and wherein one or more of at least intermediate layers of said outward multi-layer co-extruded film contains 0.1 to 10 wt % of a light-shielding material.

6. The completely light-shielding packaging material as defined in claim 5, wherein said outward multi-layer co-extruded film is stretched by a factor of 3 to 12 times in the longitudinal direction and by a factor of 4 to 12 times in the transverse direction.

7. The completely light-shielding packaging material as defined in claim 1 wherein the inward polyolefin resin film has a DSC melting point of not higher than 140° C.

8. The completely light-shielding packaging material as defined in claim 1, wherein the inward multi-layer co-extruded film has a DSC melting point of not higher than 140° C.

9. A light-shielding package for a photosensitive material produced by using the completely light-shielding packaging material for a photosensitive material as defined in claim 1, said light-shielding package being produced by a heat-sealing method using said packaging material produced on laminating said outer polypropylene resin film which may be an outer multi-layer co-extruded film, and said inner polyolefin resin film which may be an inner multi-layer co-extruded film;

wherein said outer polypropylene resin film or an outermost layer of said outer multi-layer co-extruded film remote from the photosensitive material has a higher Vicat softening point by at least 15° C., a higher melting point by the DSC method by at least 10° C., and a higher Young's modulus by at least 30 kg/mm² than those of said inner polyolefin resin film or an innermost layer of said inner multi-layer co-extruded film closest to said photosensitive material.

10. The package as defined in claim 9 wherein the polypropylene resin is composed of at least one of a homopolypropylene resin and/or a propylene-α-olefin copolymer resin containing 0.001 to 3 wt % of a α-olefin comprising 2 or 4 to 10 carbon atoms, making up the outward polypropylene resin film, said polypropylene resin comprising not less than 70 wt % of a homopolypropylene resin having a melt flow rate of 0.5 to 10 g/10 min, an isotactic index of 93 to 99.5 and a Vicat softening point of 135 to 160° C.

11. The package as defined in claim 9 wherein said outward polypropylene resin film has a thermal contraction rate of 5±3% at 150° C. in the longitudinal direction.

12. The package as defined in claim 9 wherein the outward polypropylene resin film has a melting point according to the DSC method of not less than 150° C.

13. The package as defined in claim 9 wherein the outward thermoplastic resin film is an outward multi-layer co-extruded film which comprises a multi-layer co-extruded film inclusive of said outward polypropylene resin film, and wherein one or more of at least intermediate layers of said outward multi-layer co-extruded film contains 0.1 to 10 wt % of a light-shielding material.

14. The package as defined in claim 13, wherein said outward multi-layer co-extruded film is stretched by a factor of 3 to 12 times in the longitudinal direction and by a factor of 4 to 12 times in the transverse direction.

15. The package as defined in claim 9 wherein the outward polypropylene resin film is stretched by a factor of 3 to 12 times in the longitudinal direction and by a factor of 4 to 12 times in the transverse direction.

16. The package as defined in claim 9, wherein the inward polyolefin resin film contains not less than 3 wt % of an ethylene-α-olefin copolymer resin having a melt flow rate (condition E of ASTM D-1238) of 0.1 to 10 g/10 min and a density (ASDM D-1505) of 0.86 to 0.95 g/cm³.

17. The package as defined in claim 9 wherein the inward polyolefin resin film or the inward multi-layer co-extruded film has a DSC melting point of not higher than 140° C.

18. The packaging material as defined in claim 1, wherein said light-shielding material is furnace carbon black having volatile components of not higher than 2.0% and a DBP oil absorption value of not higher than 50 ml/100 g.

19. The packaging material as defined in claim 1, wherein said polyolefin resin is a polyethylene resin produced using a metal metallocene polymerization catalyst.

20. The packaging material as defined in claim 1, wherein the packaging material has a peeling strength of 5 to 300 g/15 mm width.

21. The packaging material as defined in claim 1, wherein said outward polypropylene resin film has a higher Vicat softening point by at least 15° C., a higher DSC melting point by at least 10° C., and a higher Young's modulus by at least 30 kg/mm² than those of the inward polyolefin resin film respectively.

* * * * *